US011220622B2

(12) United States Patent
Yang et al.

(10) Patent No.: US 11,220,622 B2
(45) Date of Patent: Jan. 11, 2022

(54) HIGH STABILITY POLYMER COMPOSITIONS FOR ENHANCED OIL RECOVERY APPLICATIONS

(71) Applicant: CHEVRON U.S.A. Inc., San Ramon, CA (US)

(72) Inventors: Hong Yang, Atlanta, GA (US); Frances Fournier, Marietta, GA (US)

(73) Assignee: Chevron U.S.A. Inc., San Ramon, CA (US)

( * ) Notice: Subject to any disclaimer, the term of this patent is extended or adjusted under 35 U.S.C. 154(b) by 186 days.

(21) Appl. No.: 16/024,147

(22) Filed: Jun. 29, 2018

(65) Prior Publication Data

US 2019/0002754 A1 Jan. 3, 2019

Related U.S. Application Data

(60) Provisional application No. 62/527,712, filed on Jun. 30, 2017, provisional application No. 62/527,675, filed on Jun. 30, 2017.

(51) Int. Cl.
*C09K 8/588* (2006.01)
*E21B 43/25* (2006.01)
*C09K 8/68* (2006.01)

(52) U.S. Cl.
CPC ........... *C09K 8/588* (2013.01); *C09K 8/68* (2013.01); *E21B 43/25* (2013.01); *C09K 2208/28* (2013.01)

(58) Field of Classification Search
CPC ........... C09K 2208/26; C09K 2208/32; C09K 8/588; C09K 8/805; C09K 2200/0682; C09K 2208/08; C09K 2208/10; C09K 3/10; C09K 3/1409; C09K 3/1436; C09K 5/14; C09K 8/03; C09K 8/032; C09K 8/42; C09K 8/50; C09K 8/52; C09K 8/54; C09K 8/5756; C09K 8/58; C09K 8/60; C09K 8/602; C09K 8/62; C09K 8/665; C09K 8/68; C09K 8/72; C09K 8/74; C09K 8/86; C09K 2208/28; E21B 43/26; E21B 41/0085; E21B 43/267; E21B 47/00; E21B 47/06; E21B 47/065; E21B 47/1015; E21B 47/12; E21B 47/122; E21B 47/124; E21B 43/25
See application file for complete search history.

(56) References Cited

U.S. PATENT DOCUMENTS

| | | |
|---|---|---|
| 3,734,873 A | 5/1973 | Anderson et al. |
| 3,893,510 A | 7/1975 | Elphingstone et al. |
| 4,034,809 A | 7/1977 | Phillips et al. |
| 4,052,353 A | 10/1977 | Scanley et al. |
| 4,331,787 A | 5/1982 | Fairchok et al. |
| 4,421,656 A * | 12/1983 | Donatelli ............... C08L 83/04 507/127 |
| 4,439,332 A * | 3/1984 | Frank ............... C09K 8/58 166/275 |
| 4,473,689 A | 9/1984 | Login et al. |
| 4,528,321 A | 7/1985 | Allen et al. |
| 4,622,356 A | 11/1986 | Jarovitzky et al. |
| 5,067,508 A | 11/1991 | Lee et al. |
| 5,190,374 A | 3/1993 | Harms et al. |
| 5,216,070 A | 6/1993 | Plochocka et al. |
| 5,470,150 A | 11/1995 | Pardikes |
| 5,942,469 A | 8/1999 | Juprasert et al. |
| 6,217,828 B1 | 4/2001 | Bretscer et al. |
| 6,365,656 B1 | 4/2002 | Green et al. |
| 6,392,596 B1 | 5/2002 | Lin et al. |
| 6,833,406 B1 | 12/2004 | Green et al. |
| 7,595,284 B2 | 9/2009 | Crews |
| 7,770,641 B2 | 8/2010 | Dwarakanath et al. |
| 7,939,472 B2 | 5/2011 | Crews |
| 8,357,724 B2 | 1/2013 | Deroo et al. |
| 8,360,152 B2 | 1/2013 | DeFosse et al. |
| 8,383,560 B2 | 2/2013 | Pich et al. |
| 8,865,632 B1 | 10/2014 | Parnell et al. |
| 8,946,132 B2 | 2/2015 | Chang et al. |
| 8,973,668 B2 * | 3/2015 | Sanders ............ C08G 65/2609 166/402 |
| 9,580,639 B2 | 2/2017 | Chang et al. |
| 9,988,571 B2 | 6/2018 | Salazar et al. |
| 2005/0239957 A1 | 10/2005 | Pillsbury et al. |
| 2007/0012447 A1 | 1/2007 | Fang et al. |
| 2008/0045422 A1 | 2/2008 | Hanes et al. |
| 2008/0217013 A1 | 9/2008 | Stokes et al. |
| 2011/0118153 A1* | 5/2011 | Pich ............... B01F 1/0005 507/225 |
| 2011/0140292 A1 | 6/2011 | Chang et al. |
| 2011/0151517 A1 | 6/2011 | Therre et al. |
| 2012/0071316 A1 | 3/2012 | Voss et al. |

(Continued)

FOREIGN PATENT DOCUMENTS

| | | |
|---|---|---|
| CA | 832277 A | 1/1970 |
| DE | 2419764 A1 | 12/1975 |

(Continued)

OTHER PUBLICATIONS

International Preliminary Report on Patentability issued in Application No. PCT/US18/40401, dated Jan. 9, 2020.

(Continued)

*Primary Examiner* — Kumar R Bhushan
(74) *Attorney, Agent, or Firm* — Meunier Carlin & Curfman LLC

(57) ABSTRACT

Disclosed are methods of using liquid polymer and inverse emulsion compositions comprising one or more hydrophobic liquids having a boiling point at least about 100° C.; one or more acrylamide-(co)polymers; one or more emulsifier surfactants; one or more inverting surfactants; and one or more stabilizing agents (e.g., one or more siloxane polyether compounds, one or more poly(alkyl)acrylate compounds, or any combination thereof). When the composition is inverted in an aqueous solution, it provides an inverted solution having a filter ratio using a 1.2 micron filter (FR1.2) of about 1.5 or less. The inverted solutions can be used in oil and gas operations.

35 Claims, 8 Drawing Sheets

(56) References Cited

U.S. PATENT DOCUMENTS

| | | |
|---|---|---|
| 2013/0005616 A1 | 1/2013 | Gaillard et al. |
| 2013/0197108 A1 | 8/2013 | Koczo et al. |
| 2014/0024731 A1 | 1/2014 | Blanc et al. |
| 2014/0221549 A1 | 8/2014 | Webster et al. |
| 2014/0287967 A1 | 9/2014 | Favero et al. |
| 2014/0326457 A1 | 11/2014 | Favero |
| 2015/0148269 A1 | 5/2015 | Tamsilian et al. |
| 2015/0197439 A1 | 7/2015 | Zou et al. |
| 2015/0376998 A1 | 12/2015 | Dean et al. |
| 2016/0122622 A1* | 5/2016 | Dwarakanath ......... C09K 8/588 507/225 |
| 2016/0122623 A1 | 5/2016 | Dwarakanath et al. |
| 2016/0122624 A1 | 5/2016 | Dwarakanath et al. |
| 2016/0122626 A1 | 5/2016 | Dwarakanath et al. |
| 2016/0289526 A1* | 10/2016 | Alwattari ................ C04B 28/02 |
| 2017/0037299 A1 | 2/2017 | Li et al. |
| 2017/0121588 A1 | 5/2017 | Chang et al. |
| 2017/0158947 A1 | 6/2017 | Kim et al. |
| 2017/0158948 A1 | 6/2017 | Kim et al. |
| 2017/0321111 A1 | 11/2017 | Velez et al. |

FOREIGN PATENT DOCUMENTS

| | | |
|---|---|---|
| GB | 1384470 A | 2/1975 |
| WO | 2009053029 A1 | 4/2009 |
| WO | 2012069438 A1 | 5/2012 |
| WO | 2012069477 A1 | 5/2012 |
| WO | 2012136613 A1 | 10/2012 |
| WO | 2012170373 A2 | 12/2012 |
| WO | 2013108173 A1 | 7/2013 |
| WO | 2014075964 A1 | 5/2014 |
| WO | 2016030341 A1 | 3/2016 |
| WO | 2016183335 A1 | 11/2016 |
| WO | 2017100327 A1 | 6/2017 |
| WO | 2017100329 A1 | 6/2017 |
| WO | 2017100331 A1 | 6/2017 |
| WO | 2017100344 A1 | 6/2017 |
| WO | 2017121669 A1 | 7/2017 |
| WO | 2017177475 A1 | 10/2017 |
| WO | 2017177476 A1 | 10/2017 |
| WO | 2018045282 A1 | 8/2018 |
| WO | 2019006305 A1 | 1/2019 |
| WO | 2019006307 A1 | 1/2019 |

OTHER PUBLICATIONS

International Preliminary Report on Patentability issued in Application No. PCT/US2017/065106, dated Jun. 20, 2019.
Non-Final Office Action in U.S. Appl. No. 16/441,851, dated Dec. 20, 2019.
Notice of Allowance issued in U.S. Appl. No. 15/835,020, dated Feb. 21, 2019.
Notice of Allowance issued in U.S. Appl. No. 16/441,851, dated Apr. 28, 2020.
International Search Report and Written Opinion issued in Application No. PCT/US16/65421, dated Feb. 16, 2017.
International Preliminary Report on Patentability issued in Application No. PCT/US16/65421, dated Jun. 21, 2018.
International Search Report and Written Opinion issued in Application No. PCT/US16/65391, dated Feb. 21, 2017.
International Search Report and Written Opinion issued in Application No. PCT/US16/65394, dated Feb. 6, 2017.
International Search Report and Written Opinion issued in Application No. PCT/US16/65397, dated Apr. 4, 2017.
International Search Report and Written Opinion issued in Application No. PCT/US2018/040401, dated Sep. 20, 2018.
Koh, H. "Experimental Investigation of the Effect of Polymers on Residual Oil Saturation". Ph.D. Dissertation, University of Texas at Austin, 2015.
Levitt, D. "The Optimal Use of Enhanced Oil Recovery Polymers Under Hostile Conditions". Ph.D. Dissertation, University of Texas at Austin, 2009.
Liu "Experimental Evaluation of Surfactant Application to Improve Oil Recovery", Liu, Experimental Evaluation of Surfactant Application to Improve Oil Recovery, Dissertation. Univ of Kansas, 2011 [Retrieved from the internet on Jan. 16, 2016] kuscholarworks.ke.eduhandle/1808/8378; abstract; table 5.1; p. 40, para. 4; p. 46, para. 2, 2011, abstract; table 5.1; p. 40, para. 4; p. 46, para. 2.
Magbagbeola, O.A. "Quantification of the Viscoelastic Behavior of High Molecular Weight Polymers used for Chemical Enhanced Oil Recovery". M.S. Thesis, University of Texas at Austin, 2008.
"Petroleum, Enhanced Oil Recovery," Kirk-Othmer, Encyclopedia of Chemical Technology, 2005, John Wiley and Sons, vol. 18, pp. 1-29.
Dwarakanath et al. "Permeability reduction due to use of liquid polymers and development of remediation options". SPE 179657, Society of Petroleum Engineers, SPE Improved Oil Recovery Conference, Apr. 11-13, Tulsa, Oklahoma, USA, 2016.
Hibbert et al. "Effect of mixing energy levels during batch mixing of cement slurries." SPE 25147-PA, Society of Petroleum Engineers, SPE Drilling & Completion, Mar. 1995, 10(01), 49-52.
Orban et al. "Specific mixing energy: A key factr for cement slurry quality." SPE-15578, Society of Petroleum Engineers, SPE Annual Technical Conference and Exhibition, Oct. 5-8, New Orleans, Louisiana, USA, 1986.
International Search Report and Written Opinion issued in Application No. PCT/US2017/065106, dated Feb. 13, 2018.
U.S. Appl. No. 16/441,851, "Notice of Allowance", dated Aug. 18, 2020.
European Patent Application No. 17878963.2, "Extended European Search Report", dated Jul. 23, 2020.
CRODA, Hypermer 2296-LQ-(MV), MSDS, 2017.
Extended European search report for European Patent Application No. 18822716.9, dated Feb. 22, 2021.

* cited by examiner

HIGH STABILITY POLYMER COMPOSITIONS FOR ENHANCED OIL RECOVERY APPLICATIONS

CROSS-REFERENCE TO RELATED APPLICATIONS

This application claims benefit of U.S. Provisional Application No. 62/527,675, filed Jun. 30, 2017, and U.S. Provisional Application No. 62/527,712, filed Jun. 30, 2017, both of which are hereby incorporated herein by reference.

FIELD OF THE INVENTION

The present disclosure relates to methods of using polymer compositions comprising one or more synthetic (co) polymers and one or more stabilizing agents (e.g., one or more siloxane polyether compounds, one or more poly (alkyl)acrylate compounds, or any combination thereof) which provide increased stability without detrimentally impacting the filter ratio.

BACKGROUND

Polymer flooding is a technique used in enhanced oil recovery (EOR). It involves injecting an aqueous solution of a water-soluble thickening polymer (e.g., high molecular weight polyacrylamide) into a mineral oil deposit. As a result, it is possible to mobilize additional mineral oil in the formation. Details of polymer flooding and of polymers suitable for this purpose are disclosed, for example, in "Petroleum, Enhanced Oil Recovery," Kirk-Othmer, Encyclopedia of Chemical Technology, online edition, John Wiley and Sons, 2010.

The aqueous polymer solution used in polymer flooding typically has an active polymer concentration of from about 0.05 weight percent to about 0.5 weight percent. Additional components may be added to the aqueous polymer solution, such as surfactants or biocides.

Large volumes of the aqueous polymer solution are necessary for polymer flooding and the process may go on for months or even years. Given the volumes required, conventional polymer flooding involves dissolving the polymer (in the form of a dry powder) on site using fresh water, brine, sea water, production water, and/or formation waste. Unfortunately, the conventional dissolution process is time-consuming and there are few ways to decrease the time without damaging the polymer. The space required for on-site dissolution of dry powder polymers is also significant. While space is normally not a limiting factor in land-based oil production, space is limited in off-shore oil production. Whether land-based or off-shore, the necessary equipment for conventional, dry powder-based on-site preparation of polymer flooding solutions is expensive.

Inverse emulsions (water-in-oil) and liquid polymers offer an alternative to on-site dissolution of dry powders, particularly for off-shore oil production. The active polymer concentration in inverse emulsions is typically about 30 weight percent, and is higher in liquid polymer composition. For use, the inverse emulsion or liquid polymer composition is diluted with water to provide the desired final concentration of the polymer.

The description herein of certain advantages and disadvantages of known methods and compositions is not intended to limit the scope of the present invention. Indeed, the present embodiments may include some or all of the features described above without suffering from the same disadvantages.

SUMMARY

In view of the foregoing, one or more embodiments include: a liquid polymer or inverse emulsion composition comprising: one or more hydrophobic liquids having a boiling point at least about 100° C.; one or more synthetic copolymers (e.g., one or more acrylamide-(co)polymers); one or more emulsifier surfactants; one or more inverting surfactants; and one or more stabilizing agents chosen from one or more siloxane polyether compounds, one or more poly(alkyl)acrylate compounds, or any combination thereof; wherein, when the composition is inverted in an aqueous solution, it provides an inverted polymer solution having a filter ratio using a 1.2 micron filter (FR1.2) of about 1.5 or less.

Provided herein are methods for hydrocarbon recovery. The methods for hydrocarbon recovery can comprise providing a subsurface reservoir containing hydrocarbons there within; providing a wellbore in fluid communication with the subsurface reservoir; preparing an inverted polymer solution from the liquid polymer or inverse emulsion compositions described herein; and injecting the inverted polymer solution through the wellbore into the subsurface reservoir.

DETAILED DESCRIPTION

Figure 1:
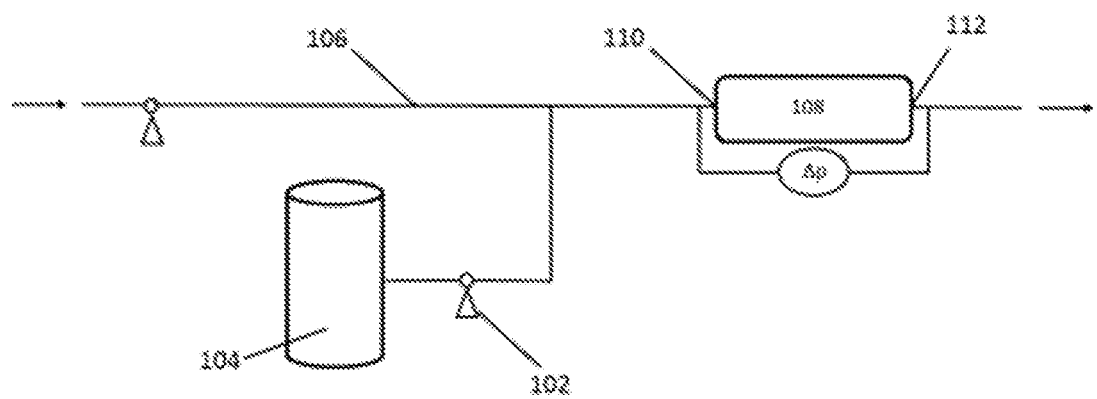
FIG. 1 is a process flow diagram illustrating a single step process for preparing an inverted polymer solution.

Generally, the various embodiments described herein provide a liquid polymer or inverse emulsion composition with enhanced stability.

It has been observed that inverse emulsion and liquid polymer compositions typically used for EOR applications tend to form gels and experience separation of their oil and water phases over time. In particular, the shelf-life stability of such compositions having high polymer actives may decrease as the solids content is raised. In some instances, such compositions may deteriorate to form an oil film and a hard cake in packaging within the amount of time it takes to manufacture and transport the compositions to the platform (e.g., about 30 days). The hard cake may not be readily redistributed in the composition, which results in lower overall polymer actives in the deteriorated composition. Thickening additives may be used to minimize settling of the inverse emulsion and liquid polymer compositions, however they may have a detrimental effect on the filter ratio of the compositions.

In particular, the compositions described herein can provide increased stability without detrimentally impacting the filter ratio. The compositions comprise one or more stabilizing agents (e.g., one or more siloxane polyether compounds, one or more poly(alkyl)acrylate compounds, or any combination thereof) which may prevent or minimize sedimentation and/or caking of solids in the liquid polymer or inverse emulsion compositions. In embodiments, the compositions according to the embodiments comprise an acrylamide (co)polymer and one or more stabilizing agents chosen from one or more siloxane polyether compounds, one or more poly(alkyl)acrylate compounds, or any combination thereof. In certain embodiments, the compositions are formed by adding one or more stabilizing agents (e.g., one or more siloxane polyether compounds, one or more poly(alkyl)acrylate compounds, or any combination thereof) to a liquid polymer or inverse emulsion composition comprising one or more acrylamide-(co)polymers, one or more hydrophobic liquids, one or more emulsifier surfactants, and one or more inverting surfactants. The various embodiments described herein also provide inverted polymer solutions derived from the compositions and methods for preparing the compositions. The liquid polymer and inverse emulsion compositions can be used in oil and gas operations, including EOR applications.

In EOR applications, the inversion of a conventional liquid polymer or inverse emulsion composition is generally difficult. The requirements of the end-users are often very strict: total dissolution in less than 5 minutes, completely and continuously. In certain embodiments, a liquid polymer or inverse emulsion composition dissolves in an aqueous solution to a final concentration of about 50 to about 15,000 ppm, or about 500 to about 5000 ppm in less than about 30 minutes, or less than about 20 minutes, or less than about 10 minutes, or less than about 5 minutes.

An inverted polymer solution prepared from the liquid polymer or inverse emulsion compositions provides excellent performance. An inverted polymer solution according to the embodiments flows through a formation without plugging the pores of the formation. Plugging the formation can slow or inhibit oil production. This is especially concerning where formation permeability is low to start with.

Related compositions are described, for example, in PCT/US2018/040300, filed Jun. 29, 2018, and PCT/US2018/040302, filed Jun. 29, 2018, each of which is hereby incorporated by reference in its entirety. The compositions described herein, as well as the compositions described in PCT/US2018/040300 and PCT/US2018/040302 can be inverted and/or otherwise used in conjunction with the methods described in International Publication No. WO 2017/100344 and U.S. Patent Application Publication No. 2017/0158948, each of which is hereby incorporated by reference in its entirety.

Definitions

As used herein, "enhanced oil recovery" (abbreviated "EOR") refers to various techniques for increasing the amount of crude oil that can be extracted from an oil field that conventional techniques do not recover.

As used herein, "filter ratio" (abbreviated "FR") or "filter quotient" are used interchangeably herein to refer to a test used to determine performance of the liquid polymer composition (or the inverted polymer solution derived therefrom) in conditions of low formation permeability consisting of measuring the time taken by given volumes/concentrations of solution to flow through a filter. The FR generally compares the filterability of the polymer solution for two equivalent consecutive volumes, which indicates the tendency of the solution to plug the filter. Lower FRs indicate better performance.

Two filter ratio test methods are referenced herein. The first method, referred to as "FR5" or "filter ratio using a 5 micron filter," involves passing a 500 mL sample of a polymer solution through a 47 mm diameter polycarbonate filter having 5 micron pores, under 1 bar pressure (+/−10%) of $N_2$ or argon at ambient temperature (e.g., 25° C.). The times required to obtain 100 g, 200 g, 400 g, and 500 g of filtrate are recorded, and the FR5 filter ratio is calculated as $$\frac{\text{time at } 500 \text{ g} - \text{time at } 400 \text{ g}}{\text{time at } 200 \text{ g} - \text{time at } 100 \text{ g}}.$$

The second method, referred to as "FR1.2" or "filter ratio using a 1.2 micron filter," involves passing a 200 mL sample of a polymer solution through a 47 mm diameter polycarbonate filter having 1.2 micron pores, under 1 bar pressure (+/−10%) of $N_2$ or argon at ambient temperature (e.g., 25° C.). The times required to obtain 60 g, 80 g, 180 g, and 200 g of filtrate are recorded, and the FR1.2 filter ratio is calculated as $$\frac{\text{time at } 200 \text{ g} - \text{time at } 180 \text{ g}}{\text{time at } 80 \text{ g} - \text{time at } 60 \text{ g}}.$$

Other filter ratio test methods are known and are used in this field. For example, the filter media used may have a different size (e.g., 90 mm), a different pore size, and/or a different substrate (e.g., nitrocellulose), the pressure may be different (e.g., 2 bars), the filtering intervals/amounts may be different, and other changes are envisioned. For example, U.S. Pat. No. 8,383,560 (incorporated herein by reference) describes an FR test method that compares the time taken by given volumes of a solution containing 1000 ppm of active polymer to flow through a 5 micron filter having a diameter of 47 mm at a pressure of 2 bars. In comparison, the methods described herein provide a better screening method for commercial conditions. In particular, the FR1.2 test method described herein, which uses a smaller pore size under lower pressure, provides more predictable results in commercial field testing. Polymers that provide acceptable results in the FR1.2 test method have exhibited easier processing with lower risk of formation damage.

As used herein, "inverted" means that the liquid polymer or inverse emulsion composition is dissolved in an aqueous solution, so that the dispersed polymer phase of the liquid polymer or inverse emulsion composition becomes a substantially continuous phase, and the hydrophobic liquid phase becomes a dispersed, discontinuous phase. The inversion point can be characterized as the point at which the viscosity of the inverted polymer solution has substantially reached its maximum under a given set of conditions. In practice, this may be determined for example by measuring viscosity of the composition periodically over time and when three consecutive measurements are within the standard of error for the measurement, then the solution is considered inverted.

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units. The term "polymer" as used herein is intended to include both the acid form of the polymer as well as its various salts.

As used herein, "polymer flooding" refers to an enhanced oil recovery technique using water viscosified with soluble polymers. Polymer flooding can yield a significant increase in oil recovery compared to conventional water flooding techniques. Viscosity is increased until the mobility of the injectant is less than that of the oil phase in place, so the mobility ratio is less than unity. This condition maximizes oil-recovery sweep efficiency, creating a smooth flood front without viscous fingering. Polymer flooding is also applied to heterogeneous reservoirs; the viscous injectant flows along high-permeability layers, decreasing the flow rates within them and enhancing sweep of zones with lower permeabilities. The two polymers that are used most frequently in polymer flooding are partially hydrolyzed polyacrylamide and xanthan. A typical polymer flood project involves mixing and injecting polymer over an extended period of time until at least about half of the reservoir pore volume has been injected.

Liquid Polymer Compositions

According to the embodiments, the liquid polymer composition comprises one or more polymers (e.g., one or more synthetic (co)polymers such as one or more acrylamide (co)polymers)) dispersed in one or more hydrophobic liquids, and one or more stabilizing agents (e.g., one or more siloxane polyether compounds, one or more poly(alkyl) acrylate compounds, or any combination thereof). In embodiments, the liquid polymer composition further comprises one or more emulsifying surfactants and one or more inverting surfactants. In embodiments, the liquid polymer composition further comprises a small amount of water, for example less than about 12%, about 10%, about 5%, about 3%, about 2.5%, about 2%, or about 1% by weight water, based on the total amount of all components of the liquid polymer composition. In embodiments, the liquid polymer composition can be water-free or at least substantially water-free. The liquid polymer composition may include one or more additional components, which do not substantially diminish the desired performance or activity of the composition. It will be understood by a person having ordinary skill in the art how to appropriately formulate the liquid polymer composition to provide necessary or desired features or properties.

In embodiments, a liquid polymer composition comprises: one or more hydrophobic liquids having a boiling point at least about 100° C.; at least about 39% by weight of one or more acrylamide-(co)polymers; one or more emulsifier surfactants; one or more inverting surfactants; and one or more stabilizing agents chosen from one or more siloxane polyether compounds, one or more poly(alkyl)acrylate compounds, or any combination thereof; wherein, when the composition is inverted in an aqueous solution, it provides an inverted polymer solution having a filter ratio using a 1.2 micron filter (FR1.2) of about 1.5 or less. In embodiments, the liquid polymer composition may optionally comprise one or more additional stabilizing agents.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 40° C., and a FR1.2 (1.2 micron filter) of about 1.5 or less.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 30° C., and a FR1.2 (1.2 micron filter) of about 1.5 or less.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 25° C., and a FR1.2 (1.2 micron filter) of about 1.5 or less.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 40° C., and a FR1.2 (1.2 micron filter) of about 1.1 to about 1.3.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 30° C., and a FR1.2 (1.2 micron filter) of about 1.1 to about 1.3.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 25° C., and a FR1.2 (1.2 micron filter) of about 1.1 to about 1.3.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 40° C., and a FR1.2 (1.2 micron filter) of about 1.2 or less.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 30° C., and a FR1.2 (1.2 micron filter) of about 1.2 or less.

In embodiments, when the liquid polymer composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least about 10 cP, or at least about 20 cP, at about 25° C., and a FR1.2 (1.2 micron filter) of about 1.2 or less.

In embodiments, the liquid polymer composition, prior to inversion, comprises less than about 12% water by weight, less than about 10% by weight, less than about 7% water by weight, less than about 5% water by weight, or less than about 3% water by weight. In embodiments, the liquid polymer composition, prior to inversion comprises from about 1 to about 12% water by weight, or about 1% to about 5% water by weight based on the total amount of all components of the composition.

In embodiments, the liquid polymer composition, prior to inversion, comprises at least about 39%, about 40%, about 45%, about 50%, about 55%, about 60%, about 65%, about 70%, or about 75% polymer by weight based on the total amount of all components of the composition.

In embodiments, the water in the liquid polymer composition may be freshwater, saltwater, or any combination thereof. Generally, the water used may be from any source, provided that it does not contain an excess of compounds that may adversely affect other components in the composition.

In embodiments, the inverted polymer solution has a viscosity greater than about 10 cP at about 25° C. In embodiments, the inverted polymer solution has a viscosity in the range of about 10 cP to about 35 cP, about 15 to about 30, about 20 to about 35, or about 20 to about 30, at about 25° C. In embodiments, the inverted polymer solution has a viscosity greater than about 10 cP at about 30° C. In embodiments, the inverted polymer solution has a viscosity in the range of about 10 cP to about 30 cP, about 15 cP to about 30 cP, about 15 cP to about 25 cP, about 25 cP to about 30 cP, about 15 cP to about 22 cP, about 20 cP to about 30 cP, at about 30° C. In embodiments, the inverted polymer solution has a viscosity greater than about 10 cP at about 40° C. In embodiments, the inverted polymer solution has a viscosity in the range of about 10 cP to about 35 cP, about 15 cP to about 35 cP, about 15 cP to about 25 cP, about 15 cP to about 22 cP, about 20 cP to about 30 cP, at about 40° C.

In embodiments, the liquid polymer compositions, when inverted in an aqueous solution, provide an inverted polymer solution having a FR1.2 of about 1.5 or less. Put another way, an inverted polymer solution that is derived from the liquid polymer composition disclosed herein provides an FR1.2 of about 1.5 or less. In field testing, the compositions (upon inversion) exhibit improved injectivity over commercially-available polymer compositions, including other polymer compositions having an FR5 (using a 5 micron filter) of about 1.5 or less. In embodiments, the liquid polymer compositions, when inverted in an aqueous solution, provide an inverted polymer solution having a FR1.2 of about 1.1 to about 1.4, about 1.1 to about 1.35, about 1.0 to about 1.3, or about 1.1 to about 1.3.

In embodiments, a liquid polymer composition when inverted has an FR1.2 (1.2 micron filter) of about 1.5 or less, about 1.4 or less, about 1.3 or less, about 1.2 or less, or about 1.1 or less. In embodiments, the liquid polymer composition that is inverted has an FR5 (5 micron filter) of about 1.5 or less, about 1.4 or less, about 1.3 or less, about 1.2 or less, or about 1.1 or less. In embodiments, the liquid polymer composition that is inverted has an FR1.2 of about 1.2 or less and a FR5 of about 1.2 or less.

In embodiments, the inverted polymer solution has a FR1.2 of about 1.5 or less, about 1.4 or less, about 1.3 or less, about 1.2 or less, or about 1.1 or less. In embodiments, the inverted polymer solution has an FR5 of about 1.5 or less, about 1.4 or less, about 1.3 or less, about 1.2 or less, or about 1.1 or less. In other embodiments, the inverted polymer solution has an FR5 of about 1.5 or less, and an FR1.2 of about 1.5 or less.

Inverse Emulsion Compositions

According to the embodiments, an inverse emulsion composition comprises one or more polymers emulsified in one or more hydrophobic liquids, and one or more stabilizing agents (e.g., one or more siloxane polyether compounds, one or more poly(alkyl)acrylate compounds, or any combination thereof). In embodiments, the inverse emulsion composition further comprises one or more emulsifying surfactants and one or more inverting surfactants. The inverse emulsion composition may include one or more additional components, which do not substantially diminish the desired performance or activity of the composition. It will be understood by a person having ordinary skill in the art how to appropriately formulate the inverse emulsion composition to provide necessary or desired features or properties.

In embodiments, the inverse emulsion composition further comprises water. In embodiments, the water is in the emulsified polymer phase. In embodiments, the inverse emulsion comprises greater than about 12% by weight water, based on the total amount of all components of the composition. In embodiments, the water in the inverse emulsion composition may be freshwater, saltwater, or any combination thereof. Generally, the water used may be from any source, provided that it does not contain an excess of compounds that may adversely affect other components in the composition.

In embodiments, the inverse emulsion composition comprises: one or more hydrophobic liquids having a boiling point at least about 100° C.; up to about 35% by weight of one or more acrylamide-(co)polymers; one or more emulsifier surfactants; one or more inverting surfactants; and one or more stabilizing agents chosen from one or more siloxane polyether compounds, one or more poly(alkyl)acrylate compounds, or any combination thereof, wherein when the composition is inverted in an aqueous solution, it provides an inverted polymer solution having a filter ratio using a 1.2 micron filter (FR1.2) of about 1.5 or less. In embodiments, the inverse emulsion composition may optionally comprise one or more other stabilizing agents.

In embodiments, when the inverse emulsion composition is inverted in an aqueous solution, providing an inverted polymer solution having about 500 to about 5000 ppm, or about 500 to about 3000 ppm, active polymer concentration, the inverted polymer solution has a viscosity of at least 20 cP at 40° C., and a FR1.2 (1.2 micron filter) of about 1.5 or less.

In embodiments, when the inverse emulsion composition is inverted in an aqueous solution, providing an inverted polymer solution having about 500 to about 5000 ppm, or about 500 to about 3000 ppm, active polymer concentration, the inverted polymer solution has a viscosity of at least 20 cP at 30° C., and a FR1.2 (1.2 micron filter) of about 1.5 or less.

In embodiments, the inverse emulsion composition, prior to inversion, comprises up to about 35% polymer by weight, or up to about 30% polymer by weight, based on the total amount of all components of the composition.

In embodiments, the inverted polymer solution has a viscosity in the range of about 25 cP to about 35 cP at about 30° C. In embodiments, the inverted polymer solution has a viscosity greater than about 10 cP at about 40° C. In embodiments, the inverted polymer solution has a viscosity in the range of about 20 cP to about 30 cP at about 40° C.

In embodiments, the inverse emulsion compositions, when inverted in an aqueous solution, provides an inverted polymer solution having a FR1.2 of about 1.5 or less. Put another way, an inverted polymer solution that is derived from the inverse emulsion composition disclosed herein provides an FR1.2 of about 1.5 or less. In field testing, the inverse emulsion compositions, upon inversion, provide improved injectivity over commercially-available polymer compositions, including other polymer compositions having an FR5 (using a 5 micron filter) of about 1.5 or less.

In embodiments, the inverse emulsion composition, when inverted, provides an inverted polymer solution that has an FR1.2 (1.2 micron filter) of about 1.5 or less, about 1.4 or less, about 1.3 or less, about 1.2 or less, or about 1.1 or less. In embodiments, the inverse emulsion composition, when inverted, provides an inverted polymer solution that has an FR5 (5 micron filter) of about 1.5 or less, about 1.4 or less, about 1.3 or less, about 1.2 or less, or about 1.1 or less. In embodiments, an inverse emulsion composition, when inverted, provides an inverted polymer solution that has an FR1.2 of about 1.2 or less and a FR5 of about 1.2 or less.

In embodiments, the inverted polymer solution of the inverse emulsion composition has a FR1.2 of about 1.5 or less, about 1.4 or less, about 1.3 or less, about 1.2 or less, or about 1.1 or less. In embodiments, the inverted polymer solution of the inverse emulsion composition has an FR5 of about 1.5 or less, about 1.4 or less, about 1.3 or less, about 1.2 or less, or about 1.1 or less. In other embodiments, the inverted polymer solution of the inverse emulsion composition has an FR5 of about 1.5 or less, and an FR1.2 of about 1.5 or less.

Below, the components of the liquid polymer and inverse emulsion compositions are discussed in greater detail.

Polymer Component

In embodiments, the liquid polymer or inverse emulsion composition comprises at least one polymer or copolymer. The at least one polymer or copolymer may be any suitable polymer or copolymer, such as a water-soluble thickening polymer or copolymer.

In some embodiments, at least one polymer or copolymer can be a synthetic (co)polymer. In some embodiments, the one or more synthetic (co)polymers can be a polymer useful for enhanced oil recovery applications. In some embodiments, the one or more synthetic (co)polymers comprise water-soluble synthetic (co)polymers. Examples of suitable synthetic (co)polymers include acrylic polymers, such as polyacrylic acids, polyacrylic acid esters, partly hydrolyzed acrylic esters, substituted polyacrylic acids such as polymethacrylic acid and polymethacrylic acid esters, polyacrylamides, partly hydrolyzed polyacrylamides, and polyacrylamide derivatives such as acrylamide tertiary butyl sulfonic acid (ATBS); copolymers of unsaturated carboxylic acids, such as acrylic acid or methacrylic acid, with olefins such as ethylene, propylene and butylene and their oxides; polymers of unsaturated dibasic acids and anhydrides such as maleic anhydride; vinyl polymers, such as polyvinyl alcohol (PVA), N-vinylpyrrolidone, and polystyrene sulfonate; and copolymers thereof, such as copolymers of these polymers with monomers such as ethylene, propylene, styrene, methylstyrene, and alkylene oxides. In some embodiments, the one or more synthetic (co)polymer can comprise polyacrylic acid (PAA), polyacrylamide (PAM), acrylamide tertiary butyl sulfonic acid (ATBS) (or AMPS, 2-acrylamido-2-methylpropane sulfonic acid), N-vinylpyrrolidone (NVP), polyvinyl alcohol (PVA), or a blend or copolymer of any of these polymers. Copolymers may be made of any combination above, for example, a combination of NVP and ATBS. In certain examples, the one or more synthetic (co)polymers can comprise acrylamide tertiary butyl sulfonic acid (ATBS) (or AMPS, 2-acrylamido-2-methylpropane sulfonic acid) or a copolymer thereof.

Non-limiting examples of suitable (co)polymers include high molecular weight polyacrylamide, copolymers of acrylamide and further comonomers, for example vinylsulfonic acid or acrylic acid. Polyacrylamide may be partly hydrolyzed polyacrylamide, in which some of the acrylamide units have been hydrolyzed to acrylic acid. In addition, it is also possible to use naturally occurring polymers, for example xanthan or polyglycosylglucan, as described, for example, by U.S. Pat. No. 6,392,596 B1 or CA 832 277.

In embodiments, the liquid polymer or inverse emulsion composition comprises one or more acrylamide copolymers. In embodiments, the one or more acrylamide (co)polymers is a polymer useful for enhanced oil recovery (EOR) applications. In a particular embodiment, the at least one polymer is a high molecular weight polyacrylamide or partially hydrolyzed products thereof.

In embodiments, the one or more acrylamide (co)polymers are in the form of particles, which are dispersed in the liquid polymer or inverse emulsion composition. In embodiments, the particles of the one or more acrylamide (co)polymers have an average particle size of about 0.4 μm to about 5 μm, or about 0.5 μm to about 4 μm, or about 0.5 μm to about 2 μm. Average particle size refers to the d50 value of the particle size distribution (number average), which can be measured by the skilled artisan using known techniques for determining the particle size distribution.

According to embodiments, the one or more acrylamide (co)polymers are selected from water-soluble acrylamide (co)polymers. In various embodiments, the acrylamide (co)polymers comprise at least 30% by weight, or at least 50% by weight acrylamide units with respect to the total amount of all monomeric units in the (co)polymer.

Optionally, the acrylamide-(co)polymers may comprise besides acrylamide at least one additional co-monomer. In embodiments, the additional comonomer is a water-soluble, ethylenically unsaturated, in particular monoethylenically unsaturated, comonomer. additional water-soluble comonomers should be miscible with water in any ratio, but it is sufficient that the monomers dissolve sufficiently in an aqueous phase to copolymerize with acrylamide. In general, the solubility of such additional monomers in water at room temperature should be at least 50 g/L, preferably at least 150 g/L and more preferably at least 250 g/L.

Other water soluble comonomers comprise one or more hydrophilic groups. The hydrophilic groups are in particular functional groups which comprise atoms selected from the group of O-, N-, S- or P-atoms. Examples of such functional groups comprise carbonyl groups >C═O, ether groups —O—, in particular polyethylene oxide groups —(CH$_2$—CH$_2$—O—)$_n$—, where n is preferably a number from 1 to 200, hydroxy groups —OH, ester groups —C(O)O—, primary, secondary or tertiary amino groups, ammonium groups, amide groups —C(O)—NH— or acid groups such as carboxyl groups —COOH, sulfonic acid groups —SO$_3$H, phosphonic acid groups —PO$_3$H$_2$ or phosphoric acid groups —PO$_4$H$_2$.

Monoethylenically unsaturated comonomers comprising acid groups include monomers comprising —COOH groups, such as acrylic acid or methacrylic acid, crotonic acid, itaconic acid, maleic acid or fumaric acid, monomers comprising sulfonic acid groups, such as vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups, such as vinylphosphonic acid, allylphosphonic acid, N-(meth)acrylamidoalkylphosphonic acids or (meth)acryloyloxyalkylphosphonic acids. Of course the monomers may be used as salts.

The —COOH groups in polyacrylamide-copolymers may not only be obtained by copolymerizing acrylamide and monomers comprising —COOH groups but also by hydrolyzing derivatives of —COOH groups after polymerization. For example, amide groups —CO—NH$_2$ of acrylamide may hydrolyze thus yielding —COOH groups.

Also to be mentioned are derivatives of acrylamide thereof, such as, for example, N-methyl(meth)acrylamide, N,N'-dimethyl(meth)acrylamide, and N-methylolacrylamide, N-vinyl derivatives such as N-vinylformamide, N-vinylacetamide, N-vinylpyrrolidone or N-vinylcaprolactam, and vinyl esters, such as vinyl formate or vinyl acetate. N-vinyl derivatives may be hydrolyzed after polymerization to vinylamine units, vinyl esters to vinyl alcohol units.

Further comonomers include monomers comprising hydroxy and/or ether groups, such as, for example, hydroxyethyl(meth)acrylate, hydroxypropyl(meth)acrylate, allyl alcohol, hydroxyvinyl ethyl ether, hydroxyl vinyl propyl ether, hydroxyvinyl butyl ether or polyethyleneoxide(meth)acrylates.

Other comonomers are monomers having ammonium groups, i.e monomers having cationic groups. Examples comprise salts of 3-trimethylammonium propylacrylamides or 2-trimethylammonium ethyl(meth)acrylates, for example the corresponding chlorides, such as 3-trimethylammonium propylacrylamide chloride (DIMAPAQUAT) and 2-trimethylammonium ethyl methacrylate chloride (MADAMEQUAT).

Yet other comonomers include monomers which may cause hydrophobic association of the (co)polymers. Such monomers comprise besides the ethylenic group and a hydrophilic part also a hydrophobic part. Such monomers are disclosed, for instance, in WO 2012/069477 A1.

In certain embodiments, each of the one or more acrylamide-(co)polymers may optionally comprise crosslinking monomers, i.e. monomers comprising more than one polymerizable group. In certain embodiments, the one or more acrylamide-(co)polymers may optionally comprise crosslinking monomers in an amount of less than about 0.5%, or about 0.1%, by weight, based on the amount of all monomers.

In an embodiment, each of the one or more acrylamide-(co)polymers comprises at least one monoethylenically unsaturated comonomer comprising acid groups, for example monomers which comprise at least one group selected from —COOH, —SO$_3$H—PO$_3$H$_2$, or —PO$_4$H$_2$ Examples of such monomers include but are not limited to acrylic acid, methacrylic acid, vinylsulfonic acid, allylsulfonic acid or 2-acrylamido-2-methylpropanesulfonic acid, particularly preferably acrylic acid and/or 2-acrylamido-2-methylpropanesulfonic acid and most preferred acrylic acid or the salts thereof. The amount of such comonomers comprising acid groups may be from about 0.1% to about 70%, about 1% to about 50%, or about 10% to about 50% by weight based on the amount of all monomers.

In an embodiment, each of the one or more acrylamide-(co)polymers comprise from about 50% to about 90% by weight of acrylamide units and from about 10% to about 50% by weight of acrylic acid units and/or their respective salts. In an embodiment, each of the one or more acrylamide-(co)polymers comprise from about 60% to 80% by weight of acrylamide units and from 20% to 40% by weight of acrylic acid units.

In embodiments, the one or more acrylamide-(co)polymers have a weight average molecular weight (Mw) of greater than about 5,000,000 Dalton, or greater than about 10,000,000 Dalton, or greater than about 15,000,000 Dalton, or greater than about 20,000,000 Dalton; or greater than about 25,000,000 Dalton.

In embodiments, the solution viscosity (SV) of a solution of the liquid polymer or inverse emulsion composition having 0.1% active polymer in a 1.0 M NaCl aqueous solution at 25° C., is greater than about 3.0 cP, or greater than about 5 cP, or greater than about 7 cP. The SV of the liquid polymer or inverse emulsion composition may be selected based, at least in part, on the intended actives concentration of the inverted polymer solution, to provide desired performance characteristics in the inverted polymer solution. For example, in embodiments, where the inverted polymer solution is intended to have an actives concentration of about 2000 ppm, it is desirable that the SV of a 0.1% solution of the liquid polymer or inverse emulsion composition is in the range of about 7.0 to about 8.6, because at this level, the inverted polymer solution has desired FR1.2 and viscosity properties. A liquid polymer or inverse emulsion composition with a lower or higher SV range may still provide desirable results, but may require changing the actives concentration of the inverted polymer solution to achieve desired FR1.2 and viscosity properties. For example, if the liquid polymer or inverse emulsion composition has a lower SV range, it would be desirable to increase the actives concentration of the inverted polymer solution.

In embodiments, the amount of the one or more acrylamide-(co)polymers in the liquid polymer composition is at least about 39% by weight based on the total amount of all components of the composition (before dissolution). In embodiments, the amount of the one or more acrylamide-(co)polymers in the liquid polymer composition is from about 39% to about 80%, or about 40% to about 60%, or about 45% to about 55% by weight based on the total amount of all components of the composition (before dissolution). In embodiments, the amount of the one or more acrylamide-(co)polymers in the liquid polymer composition is about 39%, 40%, 41%, 42%, 43%, 44%, 45%, 46%, 47%, 48%, 49%, 50%, 51%, 52%, 53%, 54%, 55%, 56%, 57%, 58%, 59% or about 60% or higher, by weight based on the total amount of all components of the composition (before dilution).

In embodiments, the amount of the one or more acrylamide-(co)polymers in the inverse emulsion composition is less than about 35% or less than about 30% by weight based on the total amount of all components of the composition (before dissolution). In embodiment, the amount of the one or more acrylamide-(co)polymers in the inverse emulsion composition is from about 10% to about 35%, or about 15% to about 30%, or about 20% to about 30% by weight based on the total amount of all components of the composition (before dissolution). In embodiments, the amount of the one or more acrylamide-(co)polymers in the inverse emulsion composition is about 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 13%, 11%, or about 10% or lower, by weight based on the total amount of all components of the composition (before dilution).

Hydrophobic Liquid

In embodiments, the liquid polymer or inverse emulsion composition comprises a hydrophobic liquid component. Any suitable hydrophobic liquid component may be used. The hydrophobic liquid component includes at least one hydrophobic liquid.

In embodiments, the one or more hydrophobic liquids are organic hydrophobic liquids. In embodiments, the one or more hydrophobic liquids each have a boiling point at least about 100° C., about 135° C. or about 180° C. If the organic liquid has a boiling range, the term "boiling point" refers to the lower limit of the boiling range.

In embodiments, the one or more hydrophobic liquids are aliphatic hydrocarbons, aromatic hydrocarbons or mixtures thereof. Hydrophobic liquids include but are not limited to: water-immiscible solvents, such as paraffin hydrocarbons, naphthene hydrocarbons, aromatic hydrocarbons, olefins, oils, stabilizing surfactants and mixtures thereof. The paraffin hydrocarbons may be saturated, linear, or branched paraffin hydrocarbons. Aromatic hydrocarbons include, but are not limited to, toluene and xylene. In embodiments, the hydrophobic liquids comprise oils, for example, vegetable oils, such as soybean oil, rapeseed oil and canola oil, and any other oil produced from the seed of any of several varieties of the rape plant.

In embodiments, the amount of the one or more hydrophobic liquids in the liquid polymer or inverse emulsion composition is from about 20% to about 60%, about 25% to about 55%, or about 35% to about 50% by weight based on the total amount of all components of the liquid dispersion polymer composition.

Emulsifying Surfactants

In embodiments, the liquid polymer or inverse emulsion composition optionally comprises one or more emulsifying surfactants.

In embodiments, the one or more emulsifying surfactants are surfactants capable of stabilizing water-in-oil emulsions. Emulsifying surfactants, among other things, lower the interfacial tension between the water and the water-immiscible liquid in the liquid polymer or inverse emulsion composition, so as to facilitate the formation of a water-in-oil polymer emulsion. It is known in the art to describe the capability of surfactants to stabilize water-in-oil-emulsions or oil-in-water emulsions by using the so called "HLB-value" (hydrophilic-lipophilic balance). The HLB-value usually is a number from 0 to 20. In surfactants having a low HLB-value, the lipophilic parts of the molecule predominate and consequently they are usually good water-in-oil emulsifiers. In surfactants having a high HLB-value the hydrophilic parts of the molecule predominate and consequently they are usually good oil-in-water emulsifiers. In embodiments, the one or more emulsifying surfactants are surfactants have an HLB-value of about 2 to about 10, or the mixture of the one or more emulsifying surfactants has an HLB-value of about 2 to about 10.

Emulsifying surfactants include, but are not limited to, sorbitan esters, in particular sorbitan monoesters with C12-C18-groups such as sorbitan monolaurate, sorbitan monopalmitate, sorbitan monostearate, sorbitan monooleate, sorbitan esters with more than one ester group such as sorbitan tristearate, sorbitan trioleate, ethoxylated fatty alcohols with 1 to 4 ethyleneoxy groups, e.g. polyoxyethylene (4) dodecylether ether, polyoxyethylene (2) hexadecyl ether, or polyoxyethylene (2) oleyl ether.

Emulsifying surfactants include, but are not limited to, emulsifiers having HLB values in the range of about 2 to about 10, preferably less than about 7. Suitable such emulsifiers include the sorbitan esters, phthalic esters, fatty acid glycerides, glycerine esters, as well as the ethoxylated versions of the above and any other well-known relatively low HLB emulsifier. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions thereof containing 1 to 10 moles of ethylene oxide per mole of the basic emulsifier. Thus, any emulsifier may be utilized which will permit the formation of the initial emulsion and stabilize the emulsion during the polymerization reaction. Examples of emulsifying surfactants also include modified polyester surfactants, anhydride substituted ethylene copolymers, N,N-dialkanol substituted fatty amides, and tallow amine ethoxylates.

In an embodiment, the liquid polymer or inverse emulsion composition comprises about 0% to about 8%, about 0.05% to about 5%, about 0.1% to about 5%, or about 0.5% to about 3% by weight of the one or more emulsifying surfactants.

These emulsifying surfactants, used alone or in mixtures, are utilized in amounts of greater than about 0.5% or greater than about 1% of the total liquid polymer or inverse emulsion composition.

Inverting Surfactants

In embodiments, the liquid polymer or inverse emulsion composition optionally comprises one or more inverting surfactants. In embodiments, the one or more inverting surfactants are surfactants which may be used to accelerate the formation of an inverted polymer solution (e.g., a (co)polymer solution) after mixing the liquid polymer or inverse emulsion composition with an aqueous solution.

The one or more inverting surfactants are not those which are used as emulsifying surfactants in the embodiments. Inverting surfactants include, but are not limited to, ethoxylated alcohols, alcohol ethoxylates, ethoxylated esters of sorbitan, ethoxylated esters of fatty acids, ethoxylated fatty acid esters, and ethoxylated esters of sorbitol and fatty acids, or any combination of the preceding. Inverting surfactants include nonionic surfactants comprising a hydrocarbon group and a polyalkylenoxy group of sufficient hydrophilic nature. In certain embodiments, nonionic surfactants of the general formula $R^1—O—(CH(R^2)—CH_2—O)_nH$ (I) may be used, wherein $R^1$ is a $C_8$-$C_{22}$-hydrocarbon group, preferably an aliphatic $C_{10}$-Cis-hydrocarbon group, n is a number of $\geq 4$, preferably $\geq 6$, and $R^2$ is H, methyl or ethyl with the proviso that at least 50% of the groups $R^2$ are H. Examples of such surfactants include polyethoxylates based on $C_{10}$-$C_{18}$-alcohols such as $C_{12/14}$-, $C_{14/18}$- or $C_{16/18}$-fatty alcohols, $C_{13}$- or $C_{13/15}$-oxoalcohols. The HLB-value may be adjusted by selecting the number of ethoxy groups. Specific examples include tridecylalcohol ethoxylates comprising from 4 to 14 ethylenoxy groups, e.g. tridecyalcohol.8 EO or $C_{12/14}$ fatty alcohol ethoxylates, e.g. $C_{12/14}$.8 EO. Examples of inverting surfactants also include modified polyester surfactants, anhydride substituted ethylene copolymers, N,N-dialkanol substituted fatty amides, and tallow amine ethoxylates.

Further inverting surfactants comprise anionic surfactants, for example surfactants comprising phosphate or phosphonic acid groups.

In embodiments, the amount of the one or more inverting surfactants in the liquid polymer or inverse emulsion composition is from about 0.5% to about 10%, or from about 1% to about 6% by weight based on the total amount of all components of the liquid polymer or inverse emulsion composition.

In certain embodiments, the one or more inverting surfactants are added to the liquid polymer or inverse emulsion composition directly after preparation of the composition comprising the one or more acrylamide (co)polymers dispersed in one or more hydrophobic liquids, and optionally the one or more emulsifying surfactants (e.g., they may be added after polymerization and/or after dewatering); i.e. the liquid polymer or inverse emulsion composition which is transported from the location of manufacture to the location of use already comprises the one or more inverting surfactants. In another embodiment the one or more inverting surfactants may be added to the liquid polymer or inverse emulsion composition at the location of use, e.g. at an off-shore production site.

Stabilizing Agents

In embodiments, the liquid polymer or inverse emulsion composition comprises one or more stabilizing agents. The stabilizing agents aim at stabilizing the dispersion of the particles of polyacrylamide-(co)polymers in the organic, hydrophobic phase and optionally also at stabilizing the droplets of the aqueous monomer phase in the organic hydrophobic liquid before and in course of the polymerization. The term "stabilizing" means, as in the usual manner, that the stabilizing agents prevent the dispersion from aggregation and flocculation, or prevent sedimentation and/or caking of the solids or particles in the composition and/or creation of separated oil phase. As used herein, "caking" refers to the formation of lumps or masses from the solids or particles in the composition. Generally, hard caking is characterized by strong, adhesive forces between the particles, and/or the formation of a cake which is difficult to redisperse. Soft caking may be characterized by weak, adhesive forces between the particles, and/or the formation of a cake which is more readily redispersed. Ideally, the solids and particles of the composition remain substantially evenly dispersed in the liquids of the composition. In certain embodiments, the stabilizing agent increases the stability of the liquid polymer or inverse emulsion composition such that the composition shows no caking, or only soft caking, after about 20, about 30, about 40, about 50, about 60, about 70, about 80, about 90 or about 100 days at a temperature in the range of about 30 to 50° C. In certain embodiments, compositions which undergo soft caking are re-dispersable with gentle agitation or stirring. In certain embodiments, the compositions show no caking, or only soft caking, after about 20, about 30, about 40, about 50, about 60, about 70, about 80, about 90 or about 100 days at a temperature in the range of about 30 to 50° C. In embodiments, less than about 10%, about 5%, or about 2% of the solids or particles in the composition have settled into a soft cake after about 20, about 30, about 40, about 50, about 60, about 70, about 80, about 90 or about 100 days at a temperature in the range of about 30 to 50° C.

The one or more stabilizing agents can be chosen from one or more siloxane polyether compounds, one or more poly(alkyl)acrylate compounds, or any combination thereof. In some embodiments, the liquid polymer or inverse emulsion composition can comprise one or more siloxane polyether compounds. In some embodiments, the liquid polymer or inverse emulsion composition can comprise one or more poly(alkyl)acrylate compounds. In some embodiments, the liquid polymer or inverse emulsion composition can comprise one or more siloxane polyether compounds and one or more poly(alkyl)acrylate compounds.

In an embodiment, the liquid polymer or inverse emulsion composition comprises about 0.5% to about 8%, about 1% to about 5%, about 1.5% to about 5%, or about 1.5% to about 3.5% by weight of the one or more stabilizing agents (e.g., one or more siloxane polyether compounds, one or more poly(alkyl)acrylate compounds, or any combination thereof).

In embodiments, the one or more stabilizing agents can comprise one or more siloxane polyether compounds, and the one or more siloxane polyether compounds can be present in amounts of greater than about 0.5%, greater than about 1%, or greater than about 2% by weight of the total liquid polymer or inverse emulsion composition.

In embodiments, the composition comprises a siloxane polyether compound with terminal or pendent ethoxylation. In an embodiment, the composition comprises a siloxane polyether compound with terminal ethoxylation. In an embodiment, the composition comprises a siloxane polyether compound of Formula I:

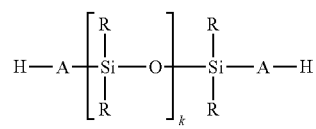

Formula I wherein each R is independently selected from methyl, ethyl and propyl;

each A independently represents a chain of ethylene oxide (EO) and, optionally, propylene oxide (PO) units, which may be present in block, alternating or random arrangement, wherein the quantity of EO units is in the range of 4 to 30 and the quantity of PO units is in the range of 0 to 30; and k is an integer from 5 to 30.

In embodiments, the A units are the same. In embodiments, the A units are different. In embodiments, the A units comprise only EO units. In embodiments, the A units comprises both EO and PO units, which are present in block arrangement, for example each A group consists of two or more, or three or more, blocks of EO or PO units. In embodiments, the A units comprises both EO and PO units, which are present in random arrangement. In embodiments, the A units comprises both EO and PO units, which are present in an alternating arrangement, e.g. an EO-PO-EO-PO chain.

In embodiments, R is methyl. In embodiments, R is ethyl. In embodiments, R is propyl, for example n-propyl or isopropyl.

In an embodiment, the composition comprises a siloxane polyether compound with pendant ethoxylation. In an embodiment, the composition comprises a siloxane polyether compound of Formula II:

Formula II

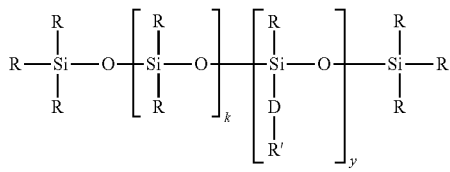

wherein each R is independently selected from methyl, ethyl and propyl;

each D independently represents a chain of ethylene oxide (EO) and, optionally, propylene oxide (PO) units, which may be present in block, alternating or random arrangement, wherein the quantity of EO units is in the range of 3 to 50 and the quantity of PO units is in the range of 0 to 40;

R' is hydroxyl or acetate;

y is an integer from 5 to 30; and k is an integer from 5 to 100.

In certain embodiments, each D independently represents a chain of ethylene oxide (EO) and propylene oxide (PO) units, which may be present in block, alternating or random arrangement, wherein the quantity of EO units is in the range of 3 to 50 and the quantity of PO units is in the range of 3 to 40.

In embodiments, the D units are the same. In embodiments, the D units are different. In embodiments, the D units comprise only EO units. In embodiments, the D units comprises both EO and PO units, which are present in block arrangement, for example each D group consists of two or more, or three or more, blocks of EO or PO units. In embodiments, the D units comprises both EO and PO units, which are present in random arrangement. In embodiments, the D units comprises both EO and PO units, which are present in an alternating arrangement, e.g. an EO-PO-EO-PO chain.

In embodiments, R is methyl. In embodiments, R is ethyl. In embodiments, R is propyl, for example n-propyl or isopropyl.

In embodiments, R' is hydroxyl. In embodiments, R' is acetate.

In embodiments, the siloxane polyether compound is, for example, a siloxane polyether with pendent ethoxylation and EO/PO ratio in the range of about 15/85 to about 85/15; about 15/85 to about 50/50; or about 25/75 to about 40/60. In embodiments, the siloxane polyether compound generally includes more EO and/or PO units than siloxane units by weight of the compound. In embodiments, the siloxane polyether compound has pendent ethoxylation and the value of y is greater than the value of k. In embodiments, the siloxane polyether compound has pendent ethoxylation and the k:y ratio is in the range of about 1:3 to about 1:100.

In embodiments, the siloxane polyether compound is, for example, a siloxane polyether with pendent ethoxylation and an HLB value of about 10 to about 14.

In embodiments, the siloxane polyether compound is selected from the following commercially available products: SG3381 from Wacker, Tegopren 5825 from Evonik, Tegopren 5863 from Evonik, and KF-355A from ShinEtsu.

In embodiments, the one or more stabilizing agents can comprise one or more poly(alkyl)acrylate compounds, and the one or more poly(alkyl)acrylate compounds can be present in amounts of about 0.5% to about 1.5%, or about 0.5% to about 1.5%, by weight of the total liquid polymer or inverse emulsion composition.

In embodiments, the composition comprises a poly(alkyl)acrylate compound of Formula III:

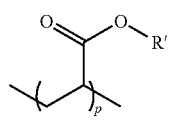

Formula III wherein

R' is a straight or branched $C_{6-14}$ alkyl group; and p is an integer from 2000 to 5000.

In an embodiments, the poly(alkyl)acrylate compound is, for example, poly(2-ethylhexyl)acrylate.

In embodiments, the poly(2-ethylhexyl)acrylate has a MW in the range about 90000 to 95000 Daltons.

In embodiments, the compositions may further comprise additional stabilizing agents, for example agents which aim at such stabilization of the dispersion or emulsion, such as oligomeric or polymeric surfactants. Due to the fact that oligomeric and polymeric surfactants have many anchor groups they absorb very strongly on the surface of the particles and furthermore oligomers/polymers are capable of forming a dense steric barrier on the surface of the particles which prevents aggregation. The number average molecular weight Mn of such oligomeric or polymeric surfactants may for example range from 500 to 60,000 Daltons, from 500 to 10,000 Daltons, or from 1,000 to 5,000 Daltons. Oligomeric and/or polymeric surfactants for stabilizing polymer dispersions are known to the skilled artisan. Examples of such stabilizing polymers comprise amphiphilic copolymers, comprising hydrophilic and hydrophobic moiety, amphiphilic copolymers comprising hydrophobic and hydrophilic monomers and amphiphilic comb polymers comprising a hydrophobic main chain and hydrophilic side chains or alternatively a hydrophilic main chain and hydrophobic side chains.

Examples of amphiphilic copolymers comprise copolymers comprising a hydrophobic moiety comprising alkylacrylates having longer alkyl chains, e.g. C6 to C22-alkyl chains, such as for instance hexyl(meth)acrylate, 2-ethylhexyl(meth)acrylate, octyl(meth)acrylate, do-decyl(meth)acrylate, hexadecyl(meth)acrylate or octadecyl(meth)acrylate. The hydrophilic moiety may comprise hydrophilic monomers such as acrylic acid, methacrylic acid or vinyl pyrrolidone.

In an embodiment, the liquid polymer or inverse emulsion composition comprises about 0% to about 8%, about 0.1% to about 5%, or about 1% to about 5% by weight of the one or more additional stabilizing agents described herein Other Components In embodiments, the liquid polymer or inverse emulsion composition may optionally comprise one or more additional components, for example to provide necessary or desirable properties to the composition or to the application. Examples of such components comprise radical scavengers, oxygen scavengers, chelating agents, biocides, stabilizers, or sacrificial agents.

Preparation of Liquid Polymer and Inverse Emulsion Compositions

In embodiments, the liquid polymer or inverse emulsion composition may be synthesized according to the following procedures.

In a first step, an inverse emulsion (water-in-oil emulsion) of acrylamide-(co)polymers is synthesized using procedures known to the skilled artisan. Such inverse emulsions are obtained by polymerizing an aqueous solution of acrylamide and other comonomers, such as water-soluble ethylenically unsaturated comonomers, emulsified in a hydrophobic oil phase. In certain embodiments, in a following step, water within such inverse emulsions is reduced to an amount of less than about 12%, or less than about 10%, or less than about 5%, by weight. Examples of such techniques are described, for instance, in U.S. Pat. No. 4,052,353, U.S. Pat. No. 4,528,321, or DE 24 19 764 A1.

For the polymerization, an aqueous monomer solution comprising acrylamide and optionally other comonomers is prepared. Acrylamide is a solid at room temperature and aqueous solutions comprising around 50% by weight of acrylamide are commercially available. If comonomers with acidic groups such as acrylic acid are used the acidic groups may be neutralized by adding aqueous bases such as aqueous sodium hydroxide. The concentration of all monomers together in the aqueous solution should usually be about 10% to about 60% by weight based on the total of all components of the monomer solution, or from about 30% to about 50%, or about 35% to about 45% by weight.

The aqueous solution of acrylamide and comonomers is emulsified in the one or more hydrophobic liquids using one or more emulsifying surfactants. The one or more emulsifying surfactants may be added to the mixture or may be added before to the monomer solution or the hydrophobic liquid. Other surfactants may be used in addition to the one or more emulsifying surfactants, such as a stabilizing surfactant. Emulsifying may be done in the usual manner, e.g. by stirring the mixture.

After an emulsion has been formed polymerization may be initiated by adding an initiator which results in generation of a suitable free radical. Any known free radical initiator may be employed. The initiators may be dissolved in a solvent, including but not limited to water or water miscible organic solvents, such as alcohols, and mixtures thereof. The initiators may also be added in the form of an emulsion. Examples of such initiators include, but are not limited to: azo compounds including 2,2'-azobis(2-amidinopropane) dihydrochloride, 2,2'-azobis[2-(2-imidazolin-2-yl)propane], 2,2'-azobis(isobutyronitrile) (AIBN), 2,2'-azobis(2,4-dimethylvaleronitrile) (AIVN), 2,2'-azobis(2-methylpropionamidine) dihydrochloride, and the like. Other initiators include peroxide initiators, for example benzoyl peroxide, t-butyl peroxide, t-butyl hydroperoxide and t-butyl perbenzoate. Other initiators include, for example, sodium bromate/sulfur dioxide, potassium persulfate/sodium sulfite, and ammonium persulfate/sodium sulfite, as well as initiators disclosed in U.S. Pat. No. 4,473,689.

In certain embodiments, one or more chain transfer agents may be added to the mixture during polymerization. Generally, chain transfer agents have at least one weak chemical bond, which therefore facilitates the chain transfer reaction. Any conventional chain transfer agent may be employed, such as propylene glycol, isopropanol, 2-mercaptoethanol, sodium hypophosphite, dodecyl mercaptan, thioglycolic acid, other thiols and halocarbons, such as carbon tetrachloride. The chain transfer agent is generally present in an amount of about 0.001 percent to about 10 percent by weight of the total emulsion, though more may be used.

The polymerization temperature usually is from about 30° C. to about 100° C., or about 30° C. to about 70° C., or about 35° C. to about 60° C. Heating may be done by external sources of heat and/or heat may be generated by the polymerization reaction itself, in particular when starting polymerization. Polymerization times may be from about 0.5 h to about 10 h.

The polymerization yields an inverse emulsion comprising an aqueous phase of the one or more acrylamide-(co) polymers dissolved or swollen in water wherein the aqueous phase is emulsified in an organic phase comprising the one or more hydrophobic liquids.

In order to convert the inverse emulsion obtained to the liquid polymer compositions, after the polymerization, some or all of the water is distilled off from the emulsion thus yielding particles of the one or more acrylamide-(co)polymers dispersed in the one or more hydrophobic liquids. Liquid polymer compositions having lower water content may provide many of the same advantages as inverse emulsions, but with significantly reduced water content. They may provide a more convenient, economically viable delivery form that offers improved properties to the emulsions or dry polymers. Because of the low/no water content they are substantially a dispersion of the polymer in a hydrophobic oil phase. Some liquid polymers and their manufacture are disclosed, for example, in German Patent Publication No. 2419764 A1, U.S. Pat. No. 4,052,353, U.S. Pat. No. 4,528,321, U.S. Pat. No. 6,365,656 B1, or U.S. Pat. No. 6,833,406 B1 (each of which is incorporated herein by reference in its entirety).

For the liquid polymer compositions, the water is removed to a level of less than about 12%, or less than about 10%, or less than about 7%, or less than about 5%, or less than about 3% by weight. In embodiments, the removal of water is carried out by any suitable means, for example, at reduced pressure, e.g. at a pressure of about 0.00 to about 0.5 bars, or about 0.05 to about 0.25 bars. The temperature for water removal steps may typically be from about 50° C. to about 150° C., although techniques which remove water at higher temperatures may be used. In certain embodiments, one or more of the hydrophobic liquids used in the inverse emulsion may be a low boiling liquid, which can distill off together with the water as a mixture.

Before or after removal of the amount of water desired, the one or more inverting surfactants, and other optional components, may be added.

In embodiments, the one or more stabilizing agents (e.g., one or more siloxane polyether compounds, one or more poly(alkyl)acrylate compounds, or any combination thereof) are added to a liquid polymer or an inverse emulsion composition comprising one or more acrylamide-(co)polymers, one or more hydrophobic liquids, one or more emulsifier surfactants, and one or more inverting surfactants. In certain embodiments, the composition is agitated or stirred after the addition of the one or more stabilizing agents as necessary to mix the one or more stabilizing agents into the composition, for example, for a period of at least about 20 minutes.

In embodiments, the one or more stabilizing agents may be added at any point during the preparation of a liquid polymer or inverse emulsion composition as long as it does not adversely impact the formation or resulting properties of the liquid polymer or inverse emulsion composition. In certain embodiments, the one or more stabilizing agents may be added, for example, after dewatering the composition or after the step of removing water from the composition during its preparation. In embodiments, the one or more stabilizing agents may be added alone or with one or more inverting surfactants. When the one or more stabilizing agents are added with the one or more inverting surfactants, they may be added to the composition separately or substantially simultaneously, or mixed to combine and then added to the composition as a blend.

In embodiments, the manufacture of the liquid polymer or inverse emulsion compositions is carried out in chemical production plants.

Aqueous Solutions

In embodiments, the aqueous solution may comprise produced reservoir brine, reservoir brine, sea water, fresh water, produced water, water, saltwater (e.g. water containing one or more salts dissolved therein), brine, synthetic brine, synthetic seawater brine, or any combination thereof.

The term "brine" or "aqueous brine" as used herein refers to sea water; naturally-occurring brine; a chloride-based, bromide-based, formate-based, or acetate-based brine containing monovalent and/or polyvalent cations or combinations thereof. Examples of suitable chloride-based brines include without limitation sodium chloride and calcium chloride. Further without limitation, examples of suitable bromide-based brines include sodium bromide, calcium bromide, and zinc bromide. In addition, examples of formate-based brines include without limitation, sodium formate, potassium formate, and cesium formate.

In certain embodiments, the aqueous solution comprises about 15,000 to about 160,000; about 15,000 to about 100,000; about 15,000 to about 50,000; about 30,000 to about 40,000; about 15,000 to about 16,000 ppm total dissolved solids (tds). In an embodiment, the aqueous solution comprises a brine having about 15,000 ppm tds.

In embodiments, the aqueous solution has a temperature of from about 1° C. to about 120° C., about 4° C. to about 45° C., or about 45° C. to about 95° C.

Generally, the aqueous solution may comprise water from any readily available source, provided that it does not contain an excess of compounds that can adversely affect other components in the inverted polymer solution or render the inverted polymer solution unsuitable for its intended use (e.g., unsuitable for use in an oil and gas operation such as an EOR operation). If desired, the aqueous solution obtained from naturally occurring sources may be treated prior to use. For example, the aqueous solution may be softened (e.g., to reduce the concentration of divalent and trivalent ions in the aqueous fluid) or otherwise treated to adjust their salinity. In certain embodiments, the aqueous solution may comprise soft brine or hard brine. In certain embodiments, the aqueous solution may comprise produced reservoir brine, reservoir brine, sea water, or any combination thereof.

In one embodiment, seawater is used as aqueous solution, since off-shore production facilities tend to have an abundance of seawater available, limited storage space, and transportation costs to and from an off-shore site are typically high. If seawater is used as the aqueous solution, it may be softened prior to the addition of the suspended polymer, thereby removing multivalent ions in the water (e.g., specifically $Mg^{2+}$ and $Ca^{2+}$).

Preparation of Inverted Polymer Solutions

According to various embodiments, a method for preparing an inverted polymer solution may include inverting and diluting a liquid polymer or inverse emulsion composition according to the embodiments described herein in an aqueous solution to provide an inverted polymer solution. In embodiments, the liquid polymer or inverse emulsion composition and an aqueous solution are mixed until the liquid polymer or inverse emulsion composition is inverted in an aqueous solution to provide an inverted polymer solution. Various processes may be employed to prepare the inverted polymer solutions. The inverted polymer solutions are useful, for example, in methods of enhanced oil recovery or in friction reduction applications. In embodiments, an inverted polymer solution comprises a liquid polymer or inverse emulsion composition according to the embodiments and an aqueous solution. In embodiments, an inverted polymer solution comprises a liquid polymer or inverse emulsion composition according to the embodiments, which has been inverted in an aqueous solution.

According to various embodiments, a method for preparing an inverted polymer solution may include inverting and/or diluting a liquid polymer or inverse emulsion composition according to the embodiments described herein in an aqueous solution to provide an inverted polymer solution. In embodiments, the liquid polymer or inverse emulsion composition and an aqueous solution are mixed until the liquid polymer composition is inverted in the aqueous solution to provide an inverted polymer solution.

In embodiments, the liquid polymer or inverse emulsion composition is inverted and diluted in the aqueous solution to provide an inverted polymer solution having an active polymer concentration of acrylamide (co)polymer between about 50 to about 15,000 ppm, or about 500 and about 5000 ppm. In embodiments, the inverted polymer solution has an FR1.2 of about 1.5 or less. In embodiments, the inverted polymer solution has an FR1.2 of about 1.1 to about 1.3. In embodiments, the inverted polymer solution has an FR1.2 of about 1.2 or less.

In some embodiments, the inverted polymer solution can have a concentration of one or more synthetic (co)polymers (e.g., one or more acrylamide (co)polymers) of at least 50 ppm (e.g., at least 100 ppm, at least 250 ppm, at least 500 ppm, at least 750 ppm, at least 1000 ppm, at least 1500 ppm, at least 2000 ppm, at least 2500 ppm, at least 3000 ppm, at least 3500 ppm, at least 4000 ppm, at least 4500 ppm, at least 5000 ppm, at least 5500 ppm, at least 6000 ppm, at least 6500 ppm, at least 7000 ppm, at least 7500 ppm, at least 8000 ppm, at least 8500 ppm, at least 9000 ppm, at least 9500 ppm, at least 10,000 ppm, at least 10,500 ppm, at least 11,000 ppm, at least 11,500 ppm, at least 12,000 ppm, at least 12,500 ppm, at least 13,000 ppm, at least 13,500 ppm, at least 14,000 ppm, or at least 14,500 ppm).

In some embodiments, the inverted polymer solution can have a concentration of one or more synthetic (co)polymers (e.g., one or more acrylamide (co)polymers) of 15,000 ppm or less (e.g., 14,500 ppm or less, 14,000 ppm or less, 13,500 ppm or less, 13,000 ppm or less, 12,500 ppm or less, 12,000 ppm or less, 11,500 ppm or less, 11,000 ppm or less, 10,500 ppm or less, 10,000 ppm or less, 9,500 ppm or less, 9,000 ppm or less, 8,500 ppm or less, 8,000 ppm or less, 7,500 ppm or less, 7,000 ppm or less, 6,500 ppm or less, 6,000 ppm or less, 5,500 ppm or less, 5,000 ppm or less, 4500 ppm or less, 4000 ppm or less, 3500 ppm or less, 3000 ppm or less, 2500 ppm or less, 2000 ppm or less, 1500 ppm or less, 1000 ppm or less, 750 ppm or less, 500 ppm or less, 250 ppm or less, or 100 ppm or less).

The inverted polymer solution can have a concentration of one or more synthetic (co)polymers (e.g., one or more acrylamide (co)polymers)ranging from any of the minimum values described above to any of the maximum values described above. For example, in some embodiments, the inverted polymer solution can have a concentration of one or more synthetic (co)polymers (e.g., one or more acrylamide (co)polymers) of from 500 to 5000 ppm (e.g., from 500 to 3000 ppm, or from 500 to 1500 ppm).

In some embodiments, the inverted polymer solution can be an aqueous unstable colloidal suspension. In other embodiments, the inverted polymer solution can be an aqueous stable solution.

In some embodiments, the inverted polymer solution can have a filter ratio of 1.5 or less (e.g., 1.45 or less, 1.4 or less, 1.35 or less, 1.3 or less, 1.25 or less, 1.2 or less, 1.15 or less, 1.1 or less, or less than 1.05) at 15 psi using a 1.2 μm filter. In some embodiments, the inverted polymer solution can have a filter ratio of greater than 1 (e.g., at least 1.05, at least 1.1, at least 1.15, at least 1.2, at least 1.25, at least 1.3, at least 1.35, at least 1.4, or at least 1.45) at 15 psi using a 1.2 μm filter.

The inverted polymer solution can have a filter ratio at 15 psi using a 1.2 μm filter ranging from any of the minimum values described above to any of the maximum values described above. For example, in some embodiments, the inverted polymer solution can have a filter ratio of from 1 to 1.5 (e.g., from 1.1 to 1.4, or from 1.1 to 1.3) at 15 psi using a 1.2 μm filter.

In certain embodiments, the inverted polymer solution can have a viscosity based on shear rate, temperature, salinity, polymer concentration, and polymer molecular weight. In some embodiments, the inverted polymer solution can have a viscosity of from 2 cP to 100 cP, where the 2 cP to 100 cP is an output using the ranges in the following table:

| | |
|---|---|
| Polymer viscosity (cP) | 2~100 |
| Shear rate (1/sec) | 0.1~1000 |
| Temperature (° C.) | 1~120 |
| Salinity (ppm) | 0~250,000 |
| Polymer concentration (ppm) | 50~15,000 |
| Polymer molecular weight (Dalton) | 2M~26M |

In embodiments, the time required for the liquid polymer or inverse emulsion composition to invert in the aqueous solution once the dissolution begins is less than 30 minutes.

As described above, methods for preparing an inverted polymer solution from the liquid polymer or inverse emulsion composition described herein can comprise inverting the liquid polymer or inverse emulsion composition in an aqueous fluid to provide an inverted polymer solution having a concentration of acrylamide (co)polymer of from 50 to 15,000 ppm. Inversion of the liquid polymer or inverse emulsion composition can be performed as a batch process or a continuous process. In certain embodiments, inversion of the liquid polymer or inverse emulsion composition can be performed as a continuous process. For example, inversion of the liquid polymer or inverse emulsion composition can be performed as a continuous process to produce a fluid stream for injection into a hydrocarbon-bearing formation. A continuous process is a process that can be effected without the need to be intermittently stopped or slowed. For example, continuous processes can meet one or more of the following criteria: (a) materials for forming the inverted polymer solution (e.g., the liquid polymer or inverse emulsion composition and the aqueous fluid) are fed into the system in which the inverted polymer solution is produced at the same rate as the inverted polymer solution is removed from the system; (b) the nature of the composition(s) introduced to the system in which the inverted polymer solution is produced is a function of the composition(s) position with the process as it flows from the point at which the composition(s) are introduced to the system to the point at which the inverted polymer solution is removed from the system; and/or (c) the quantity of inverted polymer solution produced is a function of (i) the duration for which the process is operated and (ii) the throughput rate of the process.

Inversion of the liquid polymer or inverse emulsion composition can comprise a single step, or a plurality of steps (i.e., two or more steps). In some embodiments, inversion of the liquid polymer or inverse emulsion composition can be performed in a single step. In these embodiments, the liquid polymer or inverse emulsion composition (e.g., a composition having at least 39% (e.g., 39% or more) by weight of one or more synthetic (co)polymers (e.g., one or more acrylamide (co)polymers) dispersed in a hydrophobic liquid, or a composition having up to 35% (e.g., less than 35%) by weight of one or more synthetic (co)polymers (e.g., one or more acrylamide (co)polymers) emulsified in a hydrophobic liquid) can be inverted in an aqueous fluid to provide an inverted polymer solution having a concentration of one or more synthetic (co)polymers (e.g., one or more acrylamide (co)polymers) of from 50 to 15,000 ppm.

The single inversion step can comprise diluting the liquid polymer or inverse emulsion composition in the aqueous fluid in an in-line mixer to provide the inverted polymer solution. For example, a polymer feed stream comprising the liquid polymer or inverse emulsion composition can be combined (e.g., in a fixed ratio) with an aqueous fluid stream upstream of an in-line mixer. The combined fluid stream can then pass through the in-line mixer, emerging as the inverted polymer solution. In some embodiments, the in-line mixer can have a mixer inlet and a mixer outlet, and the difference in pressure between the mixer inlet and the mixer outlet is from 15 psi to 400 psi (e.g., from 15 psi to 150 psi, from 15 psi to 100 psi, or from 15 psi to 75 psi).

An example system for inversion of liquid polymer or inverse emulsion composition in a single step is illustrated schematically in FIG. 1. As shown in FIG. 1, a pump 102 can be used to inject a stream of the liquid polymer or inverse emulsion composition 104 into a line 106 carrying the aqueous fluid stream. The combined fluid stream can then pass through an in-line mixer 108 having a mixer inlet 110 and a mixer outlet 112, emerging as the inverted polymer solution. The pressure drop through the in-line mixer 108 (Δp) can be from 15 psi to 400 psi (e.g., from 15 psi to 150 psi, from 15 psi to 100 psi, or from 15 psi to 75 psi).

In other embodiments, inversion of the liquid polymer or inverse emulsion composition can be performed in two or more steps (e.g., an inversion step in which the liquid polymer or inverse emulsion composition is inverted in the aqueous fluid to form a concentrated polymer composition having a polymer concentration of up to 15,000 ppm; and one or more dilution steps in which the concentrated polymer composition is diluted in the aqueous fluid to provide the inverted polymer solution. For example, inversion of the liquid polymer or inverse emulsion composition can be performed in two, three, four, five, or more consecutive steps. In certain cases, inversion of the liquid polymer or inverse emulsion composition can be performed in two steps. In these embodiments, inversion of the liquid polymer or inverse emulsion composition can comprise as a first step, inverting the liquid polymer or inverse emulsion composition in an aqueous fluid in a first in-line mixer having a first mixer inlet and a first mixer outlet to provide an inverted polymer solution with a concentration of synthetic (co) polymer (e.g., acrylamide (co)polymer) that is up to 15,000 ppm (e.g., from 5,000 to 15,000 ppm); and as a second step, diluting the inverted polymer solution in the aqueous fluid in a second in-line mixer having a second mixer inlet and a second mixer outlet to provide the inverted polymer solution.

For example, a polymer feed stream comprising the liquid polymer or inverse emulsion composition can be combined (e.g., in a fixed ratio) with an aqueous fluid stream upstream of a first in-line mixer. The combined fluid stream can then pass through the first in-line mixer, emerging as an inverted polymer solution with a concentration of synthetic (co) polymer (e.g., acrylamide (co)polymer) that is up to 15,000 ppm (e.g., from 5,000 to 15,000 ppm). The fluid stream can then be combined (e.g., in a fixed ratio) with a second aqueous fluid stream upstream of a second in-line mixer. The combined fluid stream can then pass through the second in-line mixer, emerging as the inverted polymer solution. In some embodiments, the first in-line mixer can have a first mixer inlet and a first mixer outlet, and the difference in pressure between the first mixer inlet and the first mixer outlet can be from 15 psi to 400 psi (e.g., from 15 psi to 150 psi, from 15 psi to 100 psi, or from 15 psi to 75 psi). In some embodiments, the second in-line mixer can have a second mixer inlet and a second mixer outlet, and the difference in pressure between the second mixer inlet and the second mixer outlet can be from 15 psi to 400 psi (e.g., from 15 psi to 150 psi, from 15 psi to 100 psi, or from 15 psi to 75 psi).

Figure 2:
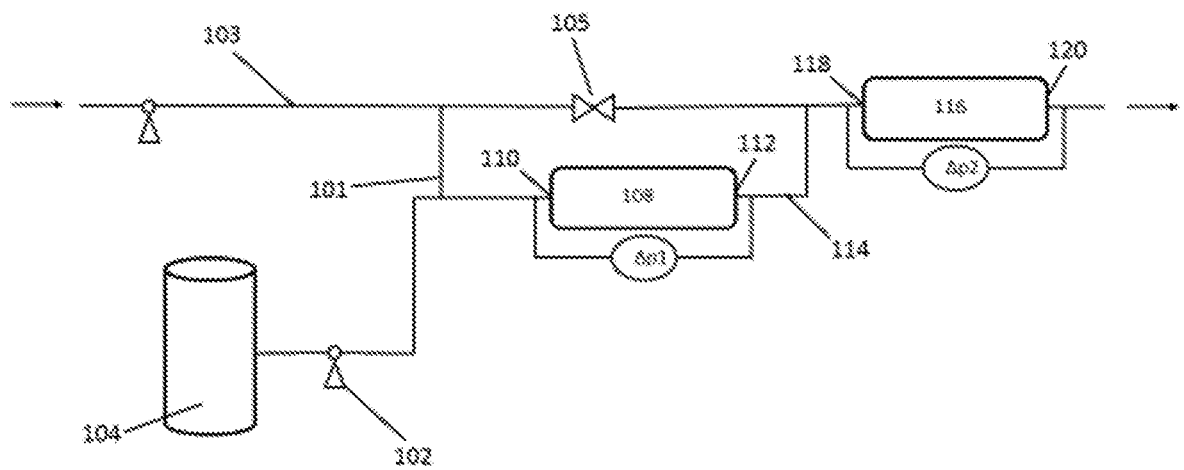
FIG. 2 is a process flow diagram illustrating a two-step process for preparing an inverted polymer solution.

An example system for inversion liquid polymer or inverse emulsion composition in two steps is illustrated schematically in FIG. 2. As shown in FIG. 2, a pump 102 can be used to inject a stream of the liquid polymer or inverse emulsion composition 104 into bypass 101 mounted on main line 103 carrying the aqueous fluid stream. A valve 105 positioned on main line 103 downstream of bypass 101 can be used to direct aqueous fluid flow through bypass 101. The combined fluid stream can then pass through a first in-line mixer 108 having a first mixer inlet 110 and a first mixer outlet 112, emerging as the inverted polymer solution with a concentration of synthetic (co)polymer (e.g., acrylamide (co)polymer) that is up to 15,000 ppm (e.g., from 5,000 to 15,000 ppm). The pressure drop through the first in-line mixer 108 (Δp1) can be from 15 psi to 400 psi (e.g., from 15 psi to 150 psi, from 15 psi to 100 psi, or from 15 psi to 75 psi). The inverted polymer fluid stream 114 can then be combined (e.g., in a fixed ratio) with the aqueous fluid stream in main line 103 upstream of a second in-line mixer 116. The combined fluid stream can then pass through a second in-line mixer 116 having a second mixer inlet 118 and a second mixer outlet 120, emerging as the inverted polymer solution. The pressure drop through the second in-line mixer 116 (Δp2) can be from 15 psi to 400 psi (e.g., from 15 psi to 150 psi, from 15 psi to 100 psi, or from 15 psi to 75 psi).

The liquid polymer or inverse emulsion composition described herein can also be inverted using inversion methods and systems known in the art, such as those described in U.S. Pat. No. 8,383,560, which is hereby incorporated by reference in its entirety.

Figure 3A:
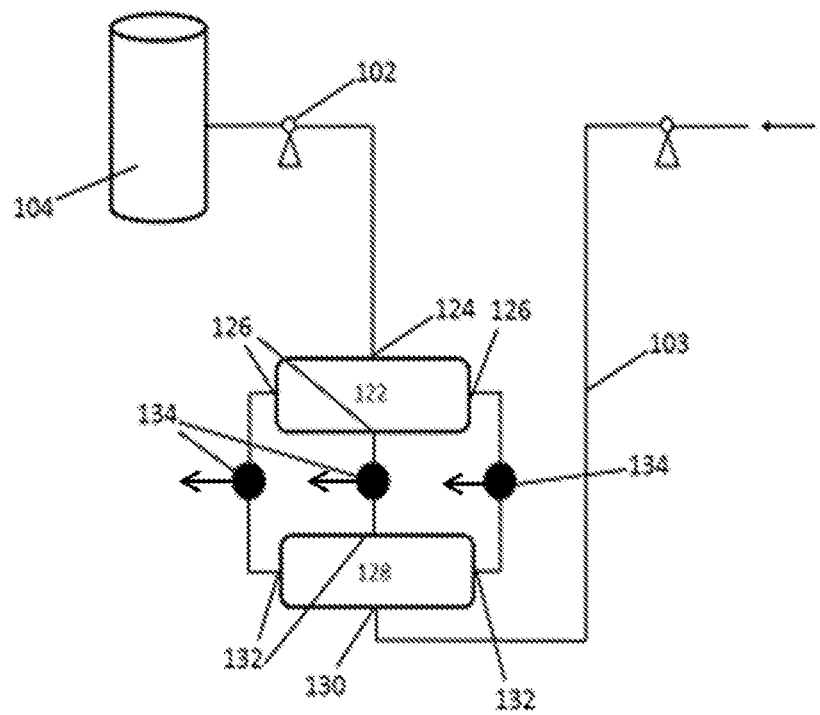
FIGS. 3A and 3B are process flow diagrams illustrating a plurality of processes for preparing inverted polymer solutions.
Figure 3B:
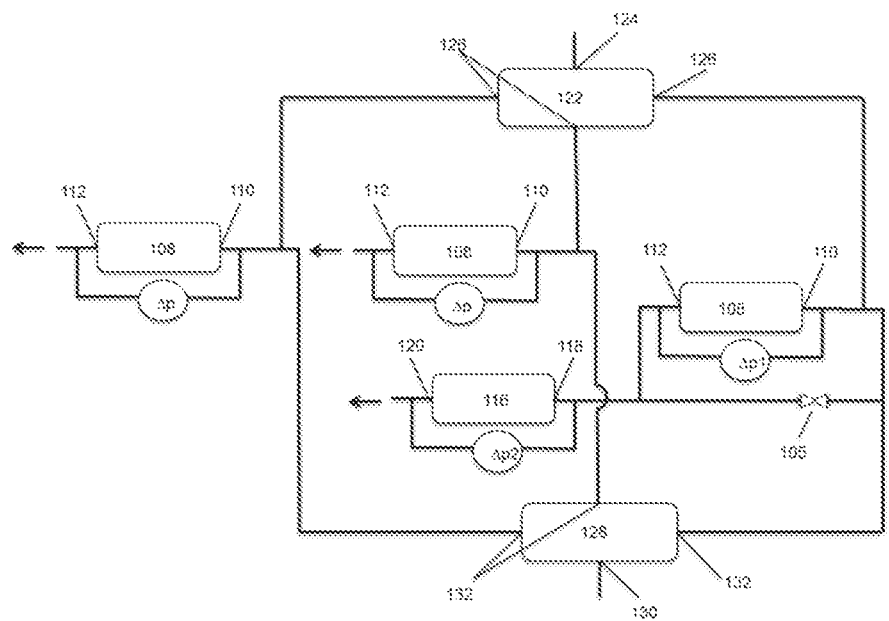

Another example system for inversion of liquid polymer or inverse emulsion composition is illustrated schematically in FIG. 3. As shown in FIG. 3A, a pump 102 can be used to direct a stream of the liquid polymer or inverse emulsion composition 104 to liquid polymer or inverse emulsion composition 122. Liquid polymer or inverse emulsion composition 122 can include an liquid polymer or inverse emulsion composition inlet 124 through which the liquid polymer or inverse emulsion composition enters the liquid polymer or inverse emulsion composition 122, and a plurality of liquid polymer or inverse emulsion composition outlets 126 (in this example three manifold outlets) through which streams of the liquid polymer or inverse emulsion composition exit the liquid polymer or inverse emulsion composition manifold 122. The system can also include a main line 103 carrying an aqueous fluid stream to aqueous fluid manifold 128. The aqueous fluid manifold 128 can include an aqueous fluid manifold inlet 130 through which the aqueous fluid enters the aqueous fluid manifold 128, and a plurality of aqueous fluid manifold outlets 132 (in this example three manifold outlets) through which streams of the aqueous fluid exit the aqueous fluid manifold 128. Each stream of liquid polymer or inverse emulsion composition exiting the liquid polymer or inverse emulsion composition manifold 122 can then be combined with a stream of aqueous fluid exiting the aqueous fluid manifold 128 in a different configuration of in-line mixers 134, thereby forming a plurality of streams of the inverted polymer solution in parallel. The configuration of in-line mixers 134 for inversion of the liquid polymer or inverse emulsion composition comprises parallel single steps, parallel multiple steps, or any combination thereof. FIG. 3B shows one example of configuration of the in-line mixers 134 comprises the combination of two single steps and one two-step of inversion process in parallel.

Any suitable in-line mixer(s) can be used in conjunction with the inversion methods described above. The in-line mixer can be a dynamic mixer or a static mixer. Suitable dynamic mixers, which involve mechanical agitation of one type or another, are known in the art, and include impeller mixers, turbine mixers, rotor-stator mixers, colloid mills, pumps, and pressure homogenizers. In certain embodiment, the in-line mixer(s) can comprise a dynamic mixer such as an electrical submersible pump, hydraulic submersible pump, or a progressive cavity pump. In certain embodiments, the in-line mixer(s) can comprise static mixers. Static mixers are mixers that mix fluids in flow without the use of moving parts. Static mixers are generally constructed from a series of stationary, rigid elements that form intersecting channels to split, rearrange and combine component streams resulting in one homogeneous fluid stream. Static mixers provide simple and efficient solutions to mixing and contacting problems. More affordable than dynamic agitator systems, static mixing units have a long life with minimal maintenance and low pressure drop. Static mixers can be fabricated from metals and/or plastics to fit pipes and vessels of virtually any size and shape. In some cases, the static mixer can comprise a region of pipe, for example a serpentine region of pipe that facilitates mixing.

The aqueous fluid used to invert the liquid polymer or inverse emulsion composition can comprise from 0 to 250,000 ppm; 15,000 to 160,000 ppm; from 15,000 to 100,000 ppm; from 10,000 to 50,000 ppm; from 15,000 to 50,000 ppm; from 30,000 to 40,000 ppm; from 10,000 to 25,000 ppm; from 10,000 to 20,000 ppm; or from 15,000 to 16,000 ppm total dissolved solids (tds). In an example embodiment, the aqueous fluid can comprise a brine having about 15,000 ppm tds. In one embodiment, the brine may be a synthetic seawater brine as illustrated in the table below.

| Composition of an Example Synthetic Seawater Brine | |
|---|---|
| Ions (ppm) | Synthetic seawater brine |
| Na+ | 10800 |
| K+ | 400 |
| Ca++ | 410 |
| Mg++ | 1280 |
| Cl− | 19400 |
| TDS | 32290 |

The aqueous fluid used to invert the liquid polymer or inverse emulsion composition can comprise produced reservoir brine, reservoir brine, sea water, fresh water, produced water, water, saltwater (e.g. water containing one or more salts dissolved therein), brine, synthetic brine, synthetic seawater brine, or any combination thereof. Generally, the aqueous fluid can comprise water from any readily available source, provided that it does not contain an excess of compounds that may adversely affect other components in the inverted polymer solution or render the inverted polymer solution unsuitable for its intended use (e.g., unsuitable for use in an oil and gas operation such as an EOR operation). If desired, aqueous fluids obtained from naturally occurring sources can be treated prior to use. For example, aqueous fluids can be softened (e.g., to reduce the concentration of divalent and trivalent ions in the aqueous fluid) or otherwise treated to adjust their salinity. In certain embodiments, the aqueous fluid can comprise soft brine or hard brine. In certain embodiments, the aqueous fluid can comprise produced reservoir brine, reservoir brine, sea water, or any combination thereof.

In one embodiment, seawater is used as the aqueous fluid, since off-shore production facilities tend to have an abundance of seawater available, limited storage space, and transportation costs to and from an off-shore site are typically high. If seawater is used as the aqueous fluid, it can be softened prior to the addition of the suspended polymer, thereby removing multivalent ions in the water (e.g., specifically $Mg^{2+}$ and $Ca^{2+}$).

In some embodiments, the aqueous fluid can have a temperature of from 1° C. to 120° C. In other embodiments, the aqueous fluid can have a temperature of from 45° C. to 95° C.

The inversion methods described herein can be specifically adapted for use in a particular oil and gas operation. For example, in some embodiments, inversion of the liquid polymer or inverse emulsion composition can be performed as a continuous process to produce a fluid stream for injection into a hydrocarbon-bearing formation.

In some cases, the in-line mixer (or one or more in-line mixers in the case of multistep inversion methods) can be arranged downstream from pumping equipment at the surface (e.g., on land, on a vessel, or on an offshore platform) that pumps the liquid polymer or inverse emulsion composition and the aqueous fluid. In certain embodiments, the in-line mixer (or one or more in-line mixers in the case of multistep inversion methods) can be positioned at or near the wellhead of a well. In certain embodiments, the in-line mixer can be arranged downhole. In certain embodiments, the in-line mixer (or one or more in-line mixers in the case of multistep inversion methods) can be positioned subsurface, subsea, or downhole.

In certain embodiments, the hydrocarbon-bearing formation can be a subsea reservoir. In these embodiments, the in-line mixer (or one or more in-line mixers in the case of multistep inversion methods) can be arranged downstream from pumping equipment at the surface (e.g., on shore, on a vessel, or on an offshore platform) that pumps the liquid polymer or inverse emulsion composition and/or the aqueous fluid. In certain embodiments, the in-line mixer (or one or more in-line mixers in the case of multistep inversion methods) can be positioned subsea. Thus, depending on the oil and gas operation, for example, an in-line mixer can be positioned on the surface, subsurface, subsea, or downhole.

Figure 4:
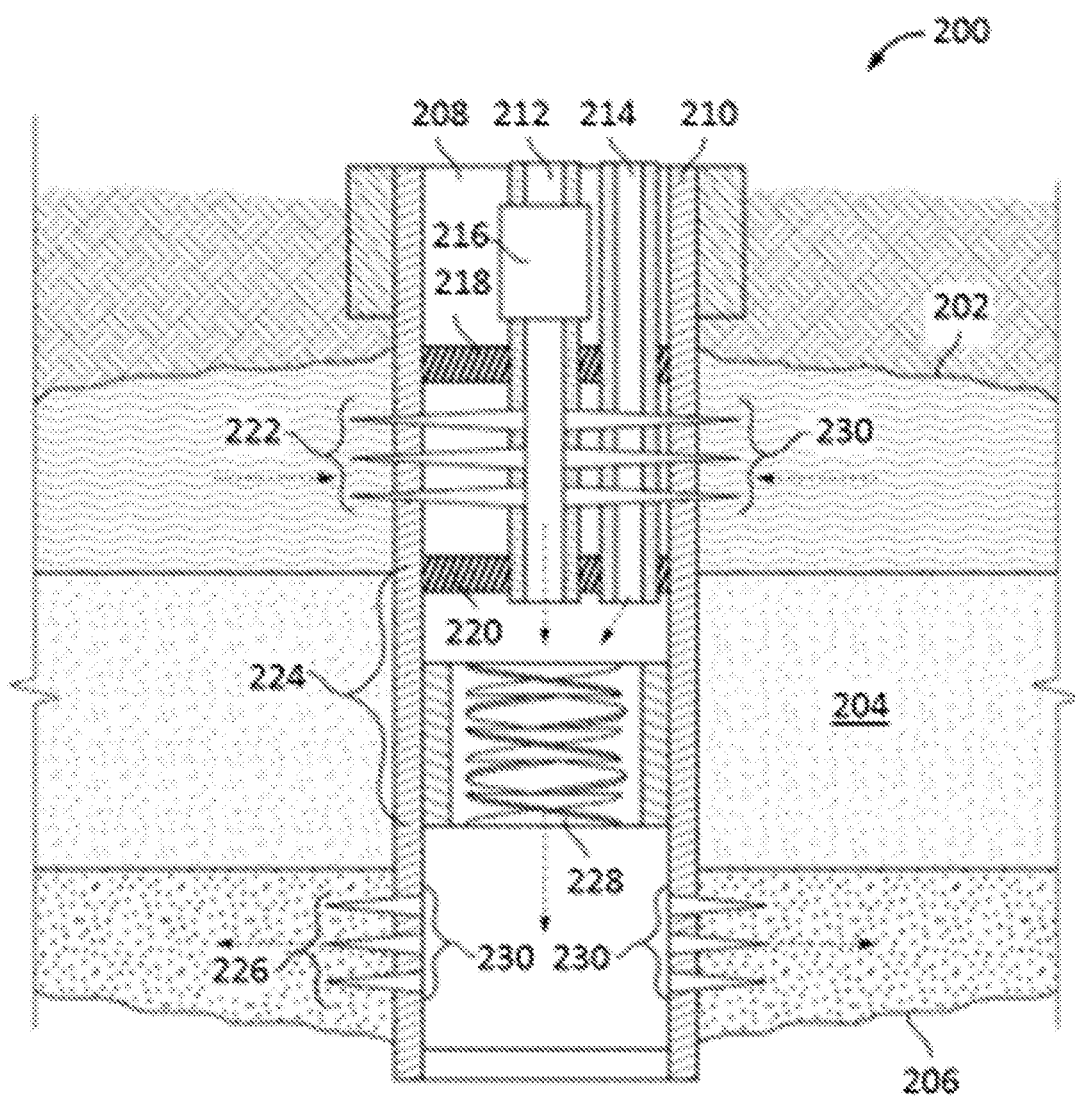
FIG. 4 illustrates an in-line injection system that can be used in conjunction with the compositions and methods described herein.

In some embodiments, the in-line mixer can be part of an in-line polymer dump flood injection system. Referring now to FIG. 4, in certain example embodiments, the in-line polymer dump flood injection system 200 can be used in a formation having a source reservoir layer 202, dividing or impermeable layers 204, and a target reservoir layer 206. The dividing or impermeable layers 204 can include shale, a combination of shales and smaller source reservoirs, gas reservoirs, or other oil reservoirs. In certain example embodiments, an injection well 208 is formed in an injection zone and completed with a casing 210. The injection well 208 is further completed by installing the injection system 200 therewithin. In certain example embodiments, the injection system 200 includes a water injection tubing 212 through which the aqueous fluid can be provided, a chemical injection tubing 214 through which liquid polymer or inverse emulsion composition can be provided, and a static mixer 228. Furthermore, in certain example embodiments, the injection well 208 is separated into a water collection zone 222, a mixing zone 224, and an injection zone 226. In certain example embodiments, the water collection zone 222 is substantially aligned with the source reservoir layer 202 of the formation, the injection zone 226 is substantially aligned with the target reservoir layer 206 of the formation, and the mixing zone 224 is disposed in between the water collection zone 222 and the injection zone 226.

In certain example embodiments, such as the example embodiment illustrated in FIG. 4, the water collection zone 222 is isolated between a first packer 218 disposed on top of the water collection zone 222 and a second packer 220 disposed between the water collection zone 222 and the mixing zone 224. In certain example embodiments, the water injection tubing 212 extends from the surface, where it is connected to a tubing string, and into the mixing zone 224, traversing the first packer 218 and the second packer 220. Accordingly, the tubing string is in fluid communication with the mixing zone 224. In certain example embodiments, the first packer 218 and second packer 220 are sealed around the water injection tubing 212. In certain example embodiments, the water injection tubing 212 and the casing 210 of the injection well 208 include a plurality of perforations 230, which put the water injection tubing 212 in fluid communication with the source reservoir layer 202. Water from the source reservoir layer 202 flows into the water collection zone through the perforations 230 in the casing 210 and then into the water injection tubing 212 through the perforations 230 in the water injection tubing 212. The water is then delivered into the mixing zone 224 via the water injection tubing 212. In certain example embodiments, the water injection tubing 212 is coupled to a pump 216, which facilitates the pulling of water out of the source reservoir layer 202 and the injection of water into the mixing zone 224. In certain example embodiments, the pump 216 controls the rate of water flow into the mixing zone 224.

In certain example embodiments, the chemical injection tubing 214 extends from the surface through to and terminating in the mixing zone 224. The chemical injection tubing 214 is coupled to a tubing string through which the liquid polymer or inverse emulsion composition can be delivered downhole and into the mixing zone 224. In certain example embodiments, the chemical injection tubing 214 traverses the first packer 218 and the second packer 220 such that the first packer 218 and the second packer 220 form a seal around the chemical injection tubing 214. In certain example embodiments, the chemical injection tubing 214 traverses the water collection zone 222 while the inside of the chemical injection tubing 214 is isolated from the water collection zone 222. In certain example embodiments, during operation, a liquid polymer or inverse emulsion composition is pumped into the mixing zone 224 from the surface via the chemical injection tubing 214. In certain example embodiments, the liquid polymer or inverse emulsion composition is pumped into the mixing zone 224 at a controlled rate. In certain example embodiments, the liquid polymer or inverse emulsion composition is pumped into the mixing zone 224 at a set ratio with respect to the water (i.e., the aqueous fluid) pumped into the mixing zone 224 via the water injection tubing 212, such that the liquid polymer or inverse emulsion composition is inverted in mixing zone 224, thereby forming an inverted polymer solution.

In certain example embodiments, when the water and the liquid polymer or inverse emulsion composition are injected into the mixing zone 224, the water and the liquid polymer or inverse emulsion composition are forced to travel through the static mixer 228. In certain example embodiments, the static mixer 228 provides a path having a plurality of obstacles which force fluid traveling therethrough to take a winding path. Thus, when water and liquid polymer or inverse emulsion composition are forced through the static mixer 228 together, the water and liquid polymer or inverse emulsion composition are mixed together, and exit the static mixer 228 as an inverted polymer solution.

In certain example embodiments, the inverted polymer solution is then injected into the injection zone 226 and ultimately injected into the surrounding target reservoir 206 via perforations 230 in the casing 210. The injection fluid injected into the target reservoir 206 increases the pressure in the target reservoir 206. This mobilizes hydrocarbons in the target reservoir and pushes the hydrocarbons towards a neighboring producing well, where the hydrocarbons are can be recovered.

Figure 5:
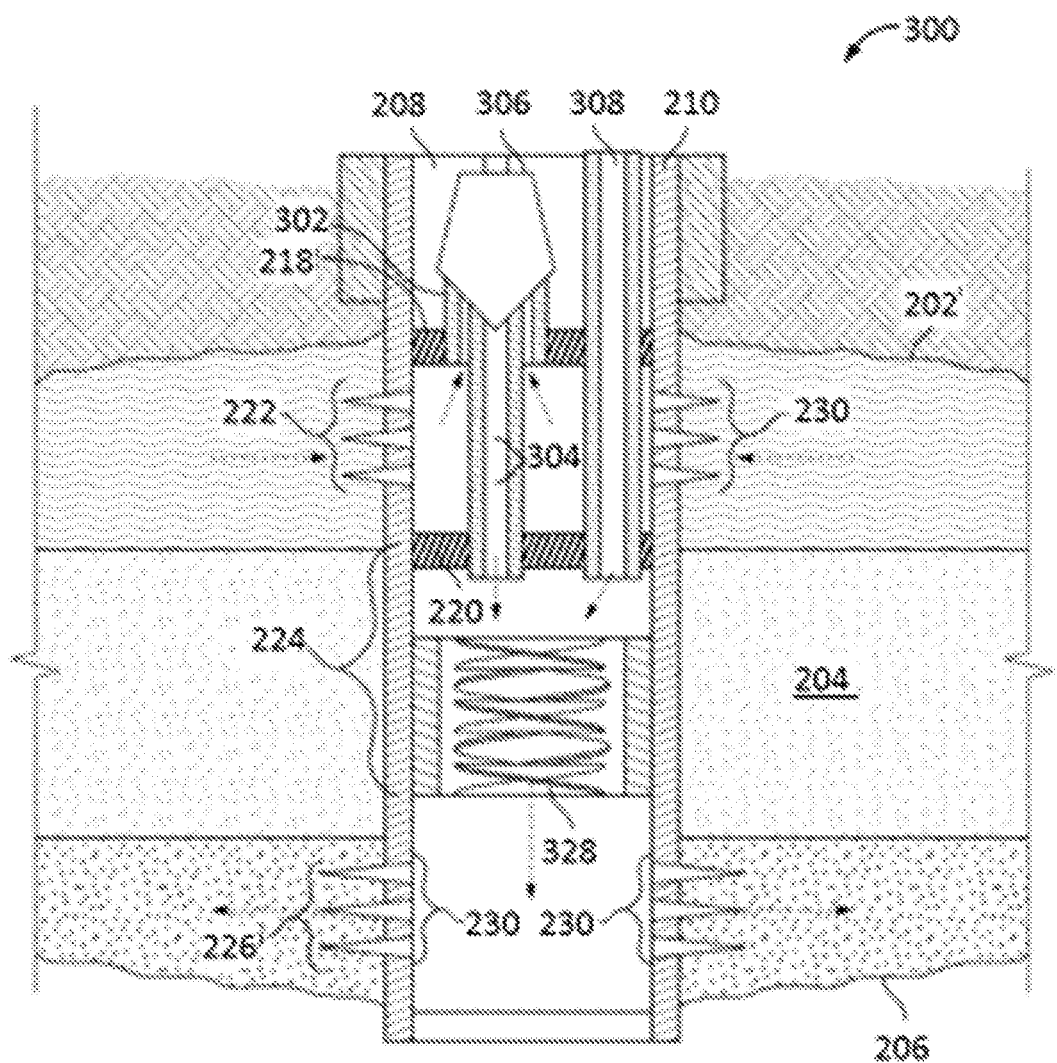
FIG. 5 illustrates an alternative in-line injection system that can be used in conjunction with the compositions and methods described herein.

FIG. 5 illustrates a second example embodiment of an in-line polymer dump flood injection system. Elements that are the same or comparable to the elements illustrated in the example shown in FIG. 4 are identified by the same reference number in FIGS. 4-9. Similar to the example illustrated in FIG. 4, the injection system 300 is installed within a cased injection well 208 having a source reservoir layer 202 and a target reservoir layer 206. In certain example embodiments, the injection well 208 is separated into the water collection zone 222, the mixing zone 224, and the injection zone 226. In certain example embodiments, the injection system 300 includes a water collection tubing 302, a water injection tubing 304, an electrical submersible pump (ESP) 306, a chemical injection tubing 308, and a static mixer 328. In certain example embodiments, the water collection zone 222 is isolated between a first packer 218 disposed on top of the water collection zone 222 and a second packer 220 disposed between the water collection zone 222 and the mixing zone 224. In certain example embodiments, the water collection tubing 302 extends from the water collection zone 222 to the ESP 306, which is located above the water collection zone 222. The water injection tubing 304 is disposed within the water collection tubing 302 and extends from the ESP 306 to the mixing zone 224, traversing the first packer 218 and the second packer 220. In certain example embodiments, water flows into the water collection zone 222 from the source reservoir 202 via a plurality of perforations 230 formed in the casing 210 of the injection well 208. The water is drawn into the ESP 306 through the water collection tubing 302, and then injected into the mixing zone 224 through the water injection tubing 304. The ESP 306 can be used to control the rate of water (i.e., aqueous fluid) injected into the mixing zone 224.

In certain example embodiments, the chemical injection tubing 308 extends from the surface through to and terminating in the mixing zone 224. The chemical injection tubing 308 is coupled to a tubing string through which a liquid polymer or inverse emulsion composition can be delivered downhole and into the mixing zone 224. In certain example embodiments, the chemical injection tubing 308 traverses the first packer 218 and the second packer 220 such that the first packer 218 and the second packer 220 form a seal around the chemical injection tubing 308. In certain example embodiments, the chemical injection tubing 308 traverses the water collection zone 222 while the inside of the chemical injection tubing 308 is isolated from the water collection zone 222. Thus, the liquid polymer or inverse emulsion composition is isolated from the ESP 306. In certain example embodiments, the liquid polymer or inverse emulsion composition is pumped into the mixing zone 224 at a controlled rate. In certain example embodiments, the liquid polymer or inverse emulsion composition is pumped into the mixing zone 224 at a set ratio with respect to the water (i.e., aqueous fluid) pumped into the mixing zone 224 via the water injection tubing 304 and ESP 306, such that the liquid polymer or inverse emulsion composition is inverted in mixing zone 224, thereby forming an inverted polymer solution.

In certain example embodiments, when the water and the liquid polymer or inverse emulsion composition are injected into the mixing zone 224, the water and the liquid polymer or inverse emulsion composition are forced to travel through the static mixer 328. When water and liquid polymer or inverse emulsion composition are forced through the static mixer 328 together, the water and liquid polymer or inverse emulsion composition are mixed together, and exit the static mixer 228 as an inverted polymer solution.

In certain example embodiments, the inverted polymer solution is then injected into the injection zone 226 and ultimately injected into the surrounding target reservoir 206 via perforations 230 in the casing 210. The injection fluid injected into the target reservoir 206 increases the pressure in the target reservoir 206. This mobilizes hydrocarbons in the target reservoir and pushes the hydrocarbons towards a neighboring producing well, where the hydrocarbons are can be recovered.

Figure 6:
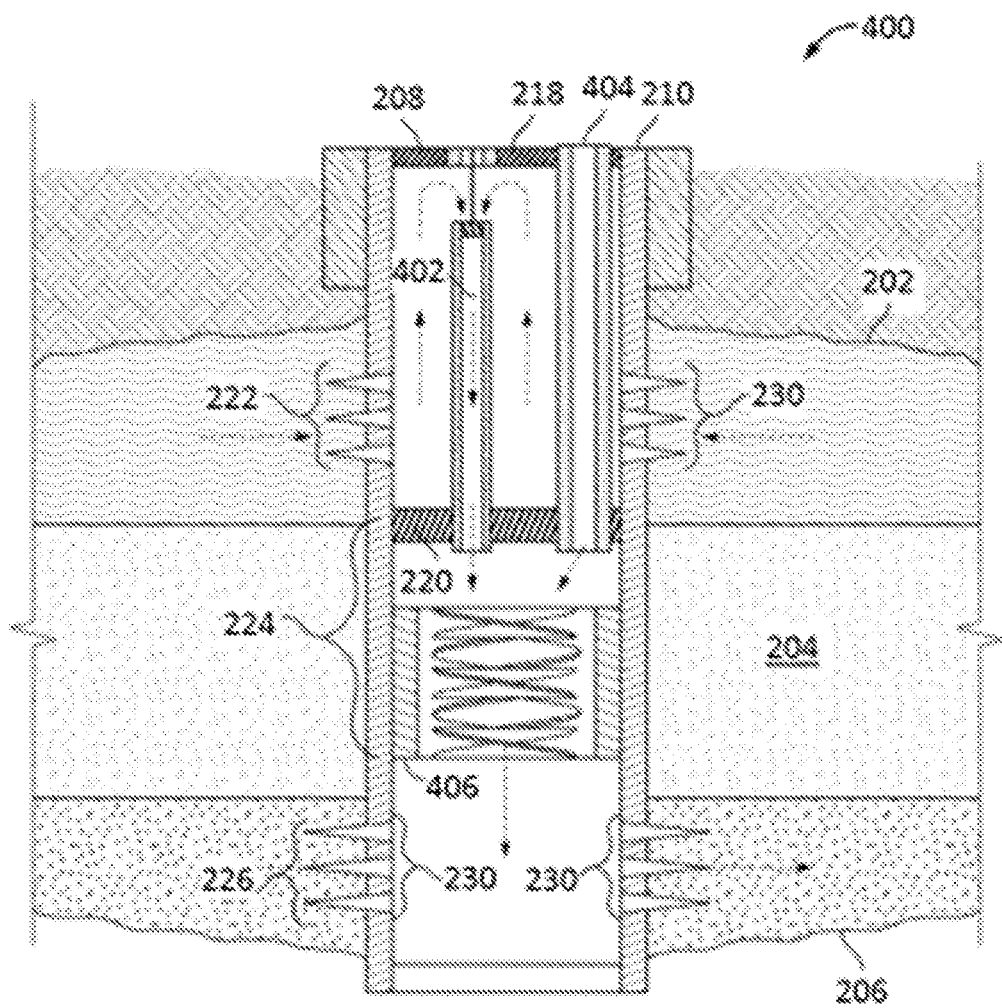
FIG. 6 illustrates an alternative in-line injection system that can be used in conjunction with the compositions and methods described herein.

FIG. 6 illustrates a third example embodiment of an in-line polymer dump flood injection system. In certain example embodiments, the injection system 400 includes a progressive cavity pump (PCP) 402, a chemical injection tubing 404, and a static mixer 406. In certain example embodiments, the water collection zone 222 is isolated between a first packer 218 disposed on top of the water collection zone 222 and a second packer 220 disposed between the water collection zone 222 and the mixing zone 224. In certain example embodiments, water flows into the water collection zone 222 from the source reservoir 202 via perforations 230 formed in the casing 210 of the injection well 208. The PCP 402 extends from the water collection zone 222 to the mixing zone 224, traversing the second packer 220. In certain example embodiments, the PCP 402 drives water from the water collection zone 222 into the mixing zone 224. The water collection zone 222 and the mixing zone 224 are otherwise isolated from each other. In one embodiment, the PCP 402 can include a stator and a drive rod, as well as an inlet towards the top of the PCP 402 and an outlet towards the bottom of the PCP 402. The water from the water collection zone 222 enters the PCP 402 through the inlet of the PCP 402 and the water exits through the outlet of the PCP 402. Thus, the PCP 402 can be used to control the rate of water (i.e., aqueous fluid) injected into the mixing zone 224.

In certain example embodiments, the chemical injection tubing 404 extends from the surface through to and terminating in the mixing zone 224. The chemical injection tubing 404 is coupled to a tubing string through which a liquid polymer or inverse emulsion composition is delivered downhole and into the mixing zone 224. In certain example embodiments, the chemical injection tubing 404 traverses the first packer 218 and the second packer 220 such that the first packer 218 and the second packer 220 form a seal around the chemical injection tubing 404. In certain example embodiments, the chemical injection tubing 404 traverses the water collection zone 222 while the inside of the chemical injection tubing 404 is isolated from the water collection zone 222. Thus, the liquid polymer or inverse emulsion composition is isolated from the PCP 402. In certain example embodiments, the liquid polymer or inverse emulsion composition is pumped into the mixing zone 224 at a controlled rate. In certain example embodiments, the liquid polymer or inverse emulsion composition is pumped into the mixing zone 224 at a set ratio with respect to the water (i.e., aqueous fluid) pumped into the mixing zone 224 via the PCP 402, such that the liquid polymer or inverse emulsion composition is inverted in mixing zone 224, thereby forming an inverted polymer solution.

In certain example embodiments, when the water and the liquid polymer or inverse emulsion composition are injected into the mixing zone 224, the water and the liquid polymer or inverse emulsion composition are forced to travel through the static mixer 406. When water and liquid polymer or inverse emulsion composition are forced through the static mixer 406 together, the water and liquid polymer or inverse emulsion composition are mixed together, and exit the static mixer 406 as an inverted polymer solution.

In certain example embodiments, the inverted polymer solution is then injected into the injection zone 226 and ultimately injected into the surrounding target reservoir 206 via perforations formed in the casing 210.

Figure 7:
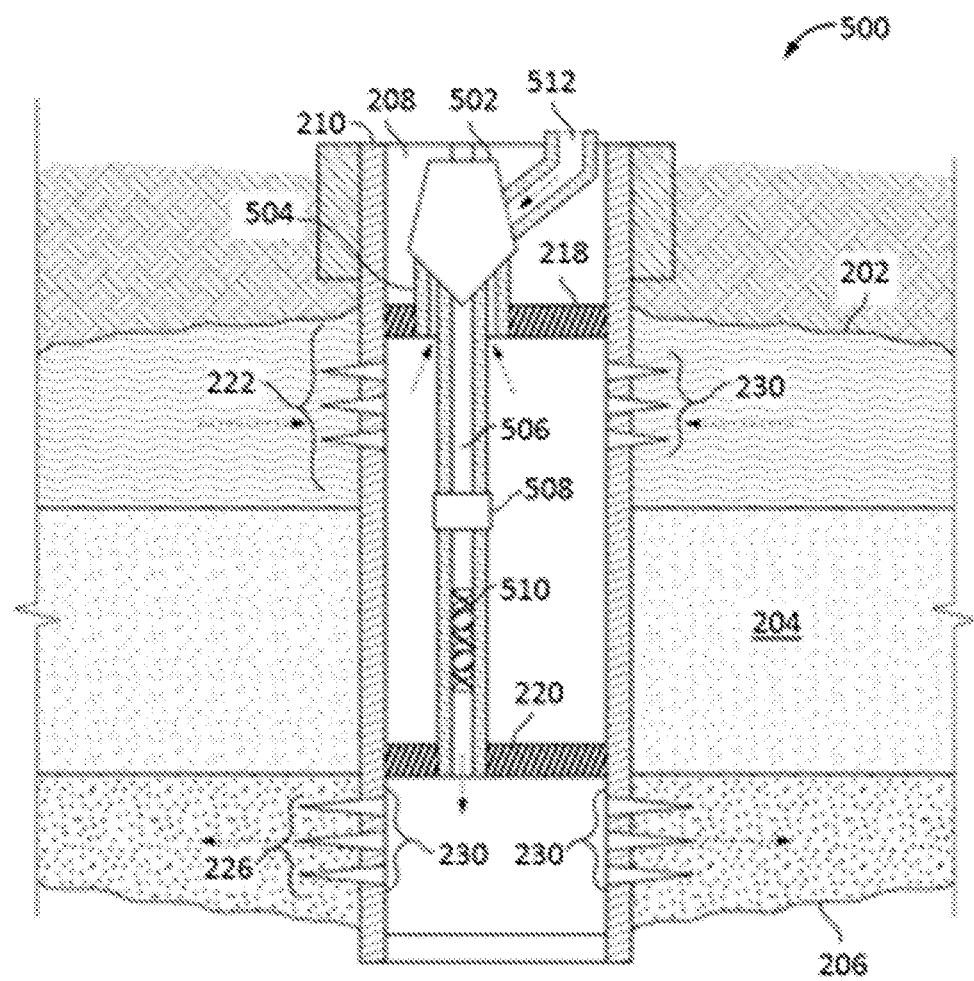
FIG. 7 illustrates an alternative in-line injection system that can be used in conjunction with the compositions and methods described herein.

FIG. 7 illustrates a fourth example embodiment of an in-line polymer dump flood injection system. In certain example embodiments, the injection system 500 is installed in an injection well 208 which is separated into a water collection zone 222 and an injection zone 226. In certain example embodiments, the water collection zone 222 is isolated between a first packer 218 disposed on top of the water collection zone 222 and a second packer 220 disposed between the water collection zone 222 and the injection zone 226. In certain example embodiments, the injection system 500 includes a water collection tubing 504, a water injection tubing 506, an ESP 502, a chemical injection tubing 512, and a static mixer 510. In certain example embodiments, the chemical injection tubing 512 extends from the surface to the ESP 502, and the chemical injection tubing 512 does not traverse the first packer 218. For example, the chemical injection tubing 512 is coupled to a tubing string through which an liquid polymer or inverse emulsion composition is delivered downhole and into the ESP 502. In certain example embodiments, water (i.e., aqueous fluid) flows into the water collection zone 222 from the source reservoir 202 via a plurality of perforations 230 formed in the casing 210 of the injection well 208. In certain example embodiments, the water collection tubing 504 extends from the water collection zone 222 to the ESP 502, which is located above the water collection zone 222. The water injection tubing 506 is disposed partially within the water collection tubing 504 and extends from the ESP 502 to the injection zone 226, traversing the first packer 218 and the second packer 220. The water (i.e., aqueous fluid) is drawn into the ESP 502 through the water collection tubing 504 and the liquid polymer or inverse emulsion composition is drawn into the ESP 502 through the chemical injection tubing 512, and then injected into the injection zone 226 through the water injection tubing 506. In certain example embodiments, a static mixer 510 is disposed within the water injection tubing 506, such that the water (i.e., aqueous fluid) and liquid polymer or inverse emulsion composition are mixed together as they travel through the water injection tubing 506 and into the injection zone 226, where they exit as an inverted polymer solution. The ESP 502 can be used to control the rate of water and liquid polymer or inverse emulsion composition injected into the injection zone 226. In certain example embodiments, the water injection tubing 506 includes a flow meter 508 which monitors flow rate. In certain example embodiments, the inverted polymer solution is then injected into the injection zone 226 and ultimately injected into the surrounding target reservoir 206 via perforations formed in the casing 210.

Figure 8:
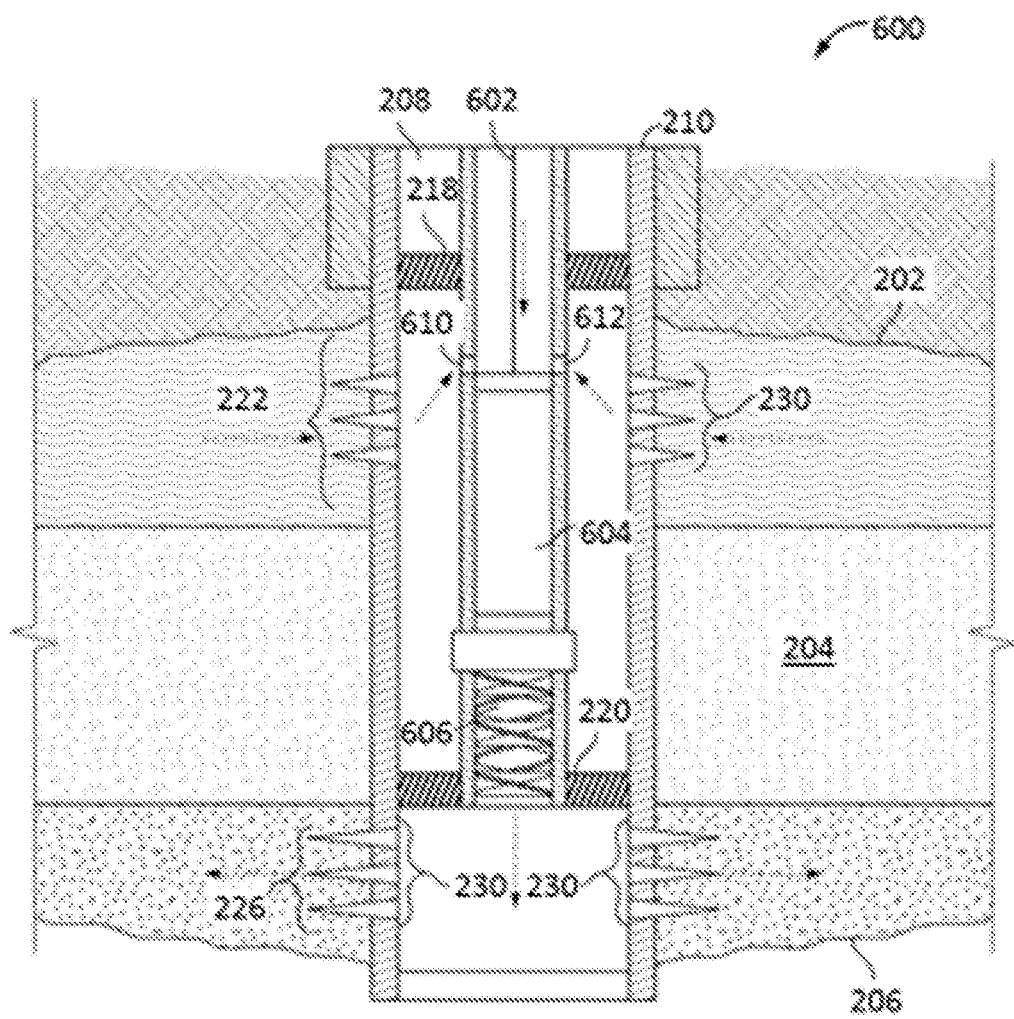
FIG. 8 illustrates an alternative in-line injection system that can be used in conjunction with the compositions and methods described herein.

FIG. 8 illustrates a fifth example embodiment of an in-line polymer dump flood injection system. In certain example embodiments, the injection system 600 is installed in an injection well 208 which is separated into a water collection zone 222 and an injection zone 226. In certain example embodiments, the water collection zone 222 is isolated between a first packer 218 disposed on top of the water collection zone 222 and a second packer 220 disposed between the water collection zone 222 and the injection zone 226. In certain example embodiments, the injection system 600 includes a chemical injection tubing 602, a PCP 604, and a static mixer 606. The PCP 604 can include a stator and a drive rod, as well as an inlet towards the top of the PCP 604 and an outlet towards the bottom of the PCP 604. In certain example embodiments, water (i.e., aqueous fluid) flows into the water collection zone 222 from the source reservoir 202 via perforations 230 formed in the casing 210 of the injection well 208. The chemical injection tubing 602 extends into the water collection zone 222 from the surface. The PCP 604 is coupled to the chemical injection tubing 602. In certain example embodiments, one way valves 610, 612 are disposed at the junction of the chemical injection tubing 602 and the PCP 604, and the one way valves 610, 612 allow water to enter the PCP 604 from the water collection zone 222. The one way valves 610, 612 are meant to allow water from the water collection zone 222 to pass through the one way valves 610, 612 (and towards the PCP 604), but the liquid polymer or inverse emulsion composition does not pass through the one way valves 610, 612 into the water collection zone 222. The water that passes through the one way valves 610, 612 and the liquid polymer or inverse emulsion composition from the chemical injection tubing 602 are pumped downward through the PCP 604. For example, the water from the water collection zone 222 and the liquid polymer or inverse emulsion composition from the chemical injection tubing 602 enter the PCP 604 through the inlet of the PCP 604 and exit through the outlet of the PCP 604 into the static mixer 606. The static mixer 606 is coupled to the PCP 604 opposite the chemical injection tubing 602. Thus, the water (i.e., aqueous fluid) and liquid polymer or inverse emulsion composition are driven into the static mixer 606 by the PCP 604, where they are mixed together, and exit the static mixer 606 as an inverted polymer solution.

In certain example embodiments, the inverted polymer solution is then injected into the injection zone 226 and ultimately injected into the surrounding target reservoir 206 via perforations 230 formed in the casing 210.

Figure 9:
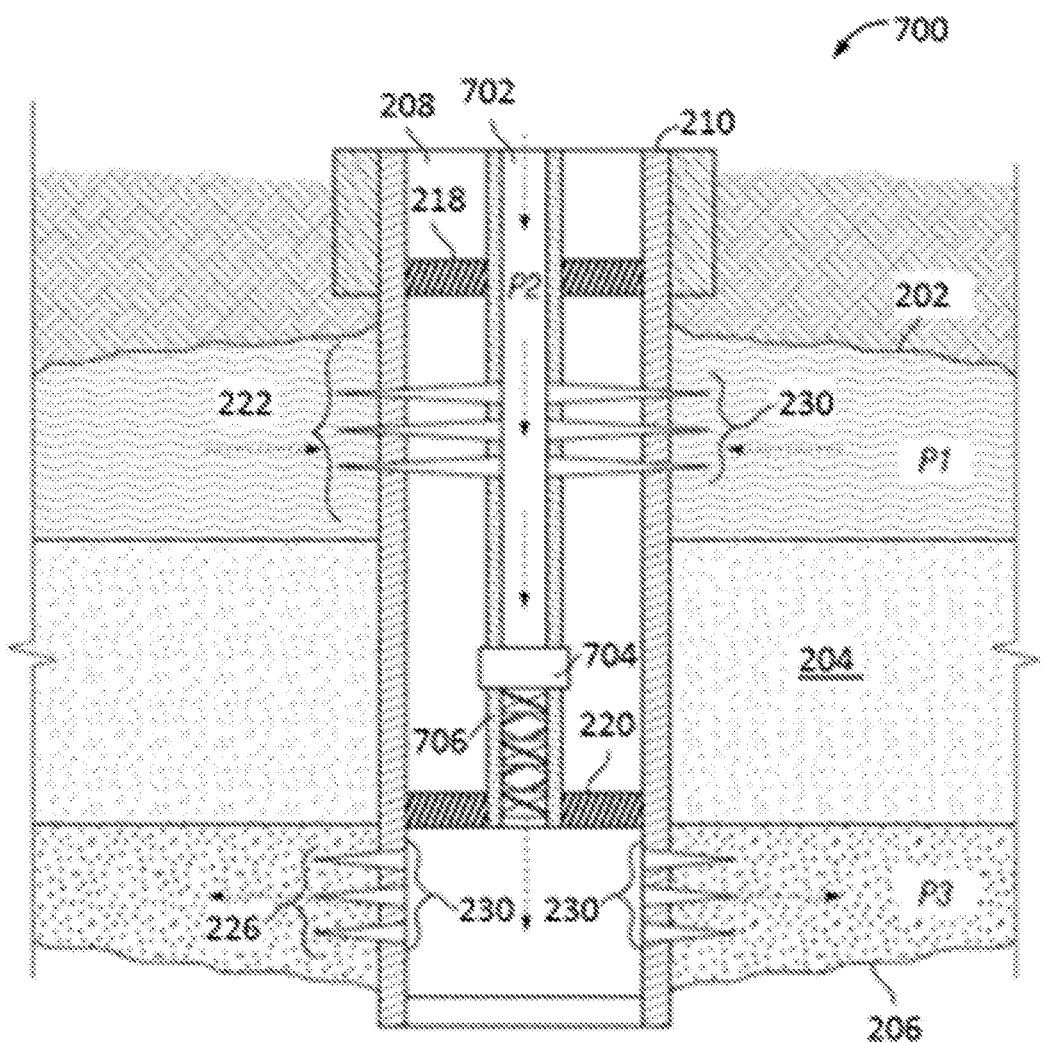
FIG. 9 illustrates an alternative in-line injection system that can be used in conjunction with the compositions and methods described herein.

FIG. 9 illustrates a sixth example embodiment of an inline chemical dump flood injection system. In certain example embodiments, the injection system 700 is installed in an injection well 208 which is separated into a water collection zone 222 and an injection zone 226. In certain example embodiments, the water collection zone 222 is isolated between a first packer 218 disposed on top of the water collection zone 222 and a second packer 220 disposed between the water collection zone 222 and the injection zone 226. In certain example embodiments, the injection system 700 includes a chemical injection tubing 702 and a static mixer 706. In certain example embodiments, the chemical injection tubing 702 also includes a flow meter for measuring flow rate. The chemical injection tubing 702 extends from the surface and into the injection zone 226. In certain example embodiments, water flows into the water collection zone 222 from the source reservoir 202 via perforations 230 formed in the casing 210 of the injection well 208. The source reservoir 202 has a particular pressure illustrated as P1. In certain example embodiments, the chemical injection tubing 702 also includes a plurality of perforations 230 which allows water to flow into the chemical injection tubing 702. A liquid polymer or inverse emulsion composition with a particular pressure illustrated as P2 is pumped into the chemical injection tubing 702 from the surface. The water (i.e., aqueous fluid) and the liquid polymer or inverse emulsion composition flow into the static mixer 706, where they are mixed together, and exit the static mixer 706 as an inverted polymer solution. The inverted polymer solution is then injected into the injection zone 226 and ultimately injected into the surrounding target reservoir 206 via perforations 230 formed in the casing 210. The target reservoir 206 has a particular pressure illustrated as P3. As explained further below, the pressure differences between P1, P2, and P3 drive the water, the liquid polymer or inverse emulsion composition, or both to their destinations.

In FIG. 9, the pressure differences between P1, P2, and P3 drive the water, the liquid polymer or inverse emulsion composition, or both to their destinations. For example, in some cases, the pressure of the source reservoir 202 is higher than the pressure of the liquid polymer or inverse emulsion composition, and the pressure of the composition is higher than the pressure of the target reservoir 206 (i.e., P1>P2>P3). The highest pressure of the source reservoir 202 causes the water to flow from the source reservoir 202 towards a region of lower pressure, that is, the water collection zone 222, the chemical injection tubing 702, and through the static mixer 706 to the target reservoir 206 with the lowest pressure. Similarly, the pressure of the liquid polymer or inverse emulsion composition causes it to flow towards a region of lower pressure, that is, through the static mixer 706 to the target reservoir 206 with the lowest pressure. As the pressure of the source reservoir 202 is higher than the pressure of the liquid polymer or inverse emulsion composition, the liquid polymer or inverse emulsion composition will not flow towards the source reservoir 202.

Like in FIG. 9, the pressure differences can drive the water, the liquid polymer or inverse emulsion composition, or both to their destinations in some of the other embodiments as well. Moreover, a pump (e.g., the pump 216, the ESP 306, 502 and the PCP 402, 604), a valve (e.g., the one way valves 610, 612), pressure differences, or any combination thereof can be used to drive the water, the liquid polymer or inverse emulsion composition, or both to their destinations. For example, in FIG. 7, (a) the highest pressure of the source reservoir 202 causes the water to flow from the source reservoir 202 towards a region of lower pressure such as the water collection zone 222, (b) the contents of the water collection zone 222 are drawn into the ESP 502 by the operation of the ESP 502, and (c) the contents in the ESP 502 travel through the water injection tubing 506 and into the injection zone 226 by the operation of the ESP 502.

As discussed above, the inverted polymer solutions described herein can be used oil and gas operations, such as EOR operations. For example, the inverted polymer solutions described above can be used in polymer flooding operations. In some cases, the inverted polymer solution further includes one or more additional agents to facilitate hydrocarbon recovery. For example, the inverted polymer solution can further include a surfactant, an alkalinity agent, a co-solvent, a chelating agent, or any combination thereof. As such, the inverted polymer solution can be used in polymer (P), alkaline-polymer (AP), surfactant-polymer (SP), and/or in alkaline-surfactant-polymer (ASP)-type EOR operations. When present, these additional components can be incorporated to the aqueous fluid used to invert the liquid polymer or inverse emulsion composition prior to inversion of the liquid polymer or inverse emulsion composition. Alternatively, these additional components can be incorporated to the inverted polymer solutions following inversion of the liquid polymer or inverse emulsion composition.

For chemical enhanced oil recovery (CEOR) operations, the liquid polymer or inverse emulsion composition can be dispersed into an aqueous stream in a sufficient amount for an injection stream with a target hydrated polymer concentration and particle size. The target concentration varies according to the type of polymer employed, as well as the characteristics of the reservoir, e.g., petrophysical rock properties, reservoir fluid properties, reservoir conditions such as temperature, permeability, water compositions, mineralogy and/or reservoir location, etc. In some cases, the inverted polymer solutions described herein are suitable for use in reservoirs with a permeability of from 10 millidarcy to 40,000 millidarcy.

The hydrated polymer molecules in the inverted polymer solution can have a particle size (radius of gyration) ranging from 0.01 to 10 μm in one embodiment. One reservoir characteristic is the median pore throats, which correspond to the permeability of the reservoirs. Depending on the reservoir, the median pore throats in reservoirs may range from 0.01 μm to several hundred micrometers. Since the size of hydrated polymers in water range from 0.01 micrometer to several micrometers depending on the species, molecules, and reservoir conditions, in one embodiment, appropriate polymers are selected for liquid polymer or inverse emulsion composition to afford an inverted polymer solution where the particle size of the hydrated polymer is <10% of the median pore throat parameters. This can allow the hydrated polymer particles to flow through the porous medium in an uninhibited manner. In another embodiment, the hydrated polymer particles have an average particle size ranging from 2 to 8% of the median pore throat size.

Surfactants can be included to lower the interfacial tension between the oil and water phase to less than about 10-2 dyne/cm (for example) and thereby recover additional oil by mobilizing and solubilizing oil trapped by capillary forces. Examples of surfactants that can be utilized include, but are not limited to, anionic surfactants, cationic surfactants, amphoteric surfactants, non-ionic surfactants, or any combination thereof. Anionic surfactants can include sulfates, sulfonates, phosphates, or carboxylates. Such anionic surfactants are known and described in the art in, for example, U.S. Pat. No. 7,770,641, incorporated herein by reference in its entirety. Examples of specific anionic surfactants include internal olefin sulfonates, isomerized olefin sulfonates, alkyl aryl sulfonates, medium alcohol (C10 to C17) alkoxy sulfates, alcohol ether [alkoxy] carboxylates, and alcohol ether [alkoxy] sulfates. Example cationic surfactants include primary, secondary, or tertiary amines, or quaternary ammonium cations. Example amphoteric surfactants include cationic surfactants that are linked to a terminal sulfonate or carboxylate group. Example non-ionic surfactants include alcohol alkoxylates such as alkylaryl alkoxy alcohols or alkyl alkoxy alcohols. Other non-ionic surfactants can include alkyl alkoxylated esters and alkyl polyglycosides. In some embodiments, multiple non-ionic surfactants such as non-ionic alcohols or non-ionic esters are combined. As a skilled artisan may appreciate, the surfactant(s) selection may vary depending upon such factors as salinity, temperature, and clay content in the reservoir.

Suitable alkalinity agents include basic, ionic salts of alkali metals or alkaline earth metals. Alkalinity agents can be capable of reacting with an unrefined petroleum acid (e.g. the acid or its precursor in crude oil (reactive oil)) to form soap (a surfactant which is a salt of a fatty acid) in situ. These in situ generated soaps can serve as a source of surfactants causing a reduction of the interfacial tension of the oil in water emulsion, thereby reducing the viscosity of the emulsion. Examples of alkali agents include alkali metal hydroxides, carbonates, or bicarbonates, including, but not limited to, sodium carbonate, sodium bicarbonate, sodium hydroxide, potassium hydroxide, sodium silicate, tetrasodium EDTA, sodium metaborate, sodium citrate, and sodium tetraborate. In some cases, the alkalinity agent can be present in the inverted polymer solution in an amount of from 0.3 to 5.0 weight percent of the solution, such as 0.5 to 3 weight percent.

The inverted polymer solution can optionally include a co-solvent. A "co-solvent" refers to a compound having the ability to increase the solubility of a solute in the presence of an unrefined petroleum acid. In embodiments, the co-solvents provided herein have a hydrophobic portion (alkyl or aryl chain), a hydrophilic portion (e.g. an alcohol) and optionally an alkoxy portion. Co-solvents as provided herein include alcohols (e.g. $C_1$-$C_6$ alcohols, $C_1$-$C_6$ diols), alkoxy alcohols (e.g. $C_1$-$C_6$ alkoxy alcohols, $C_1$-$C_6$ alkoxy diols, and phenyl alkoxy alcohols), glycol ether, glycol and glycerol. The term "alcohol" is used according to its ordinary meaning and refers to an organic compound containing an —OH groups attached to a carbon atom. The term "diol" is used according to its ordinary meaning and refers to an organic compound containing two —OH groups attached to two different carbon atoms. The term "alkoxy alcohol" is used according to its ordinary meaning and refers to an organic compound containing an alkoxy linker attached to a —OH group.

The inverted polymer solution can optionally include a chelant or chelating agent. Chelants may be used to complex with the alkali metal and soften brines. If desired, the salinity of the inverted polymer solution may be optimized for a particular subterranean reservoir by adjusting a number of chelating ligands in the chelating agent, such as alkoxylate groups if the chelant is EDTA ("ethylenediaminetetraacetic acid"). EDTA is just one example of a suitable chelant, another example of a chelant is MGDA ("methylglycinediacetic acid").

If desired, other additives can also be included in inverted polymer solutions described herein, such as biocides, oxygen scavengers, and corrosion inhibitors.

Methods of Use

The inverted polymer solutions described herein can be used in a variety of oil and gas operations, including an EOR operation, an improved oil recovery (IOR) operation, a polymer flooding operation, an AP flooding operation, a SP flooding operation, an ASP flooding operation, a conformance control operation, a hydraulic fracturing operation, a friction reduction operation, or any combination thereof. The inverted polymer solutions can even be used in water treatment operations associated with oil and gas operations. In one embodiment, the inverted polymer solution can be used as an injection fluid. In another embodiment, the inverted polymer solution can be included in an injection fluid. In another embodiment, the inverted polymer solution can be used as a hydraulic fracturing fluid. In another embodiment, the inverted polymer solution can be included in a hydraulic fracturing fluid. In another embodiment, the inverted polymer solution can be used as a drag reducer that reduces friction during transportation of a fluid in a pipeline. In another embodiment, the inverted polymer solution can be included in a drag reducer that reduces friction during transportation of a fluid in a pipeline. In short, in certain embodiments, the inverted polymer solutions described herein can be used in hydrocarbon recovery.

Methods of hydrocarbon recovery can comprise providing a subsurface reservoir containing hydrocarbons therewithin; providing a wellbore in fluid communication with the subsurface reservoir; preparing an inverted polymer solution using the methods described above; and injecting the inverted polymer solution through the wellbore into the subsurface reservoir. For example, the subsurface reservoir can be a subsea reservoir and/or the subsurface reservoir can have a permeability of from 10 millidarcy to 40,000 millidarcy.

The wellbore in the second step can be an injection wellbore associated with an injection well, and the method can further comprise providing a production well spaced-apart from the injection well a predetermined distance and having a production wellbore in fluid communication with the subsurface reservoir. In these embodiments, injection of the inverted polymer solution can increase the flow of hydrocarbons to the production wellbore.

In some embodiments, methods of hydrocarbon recovery can further include a recycling step. For example, in some embodiments, methods of hydrocarbon recovery can further comprise producing production fluid from the production well, the production fluid including at least a portion of the injected inverted polymer solution; and using the production fluid to invert an additional liquid polymer or inverse emulsion composition, for example, to form a second inverted polymer solution. The second inverted polymer solution can be injected into at least one wellbore (e.g., an injection well, the same wellbore discussed in the second step or a different wellbore, etc.). Thus, in some embodiments, the inverted polymer solution is included in an injection fluid.

The wellbore in the second step can be a wellbore for hydraulic fracturing that is in fluid communication with the subsurface reservoir. Thus, in one embodiment, the inverted polymer solution injected in the fourth step functions as a drag reducer that reduces friction during injection in the fourth step. By doing so, the inverted polymer solution is used as a drag reducer that reduces friction during transportation of a fluid (e.g., the hydraulic fracturing fluid) in a pipeline (e.g., the wellbore or components thereof). In another embodiment, the inverted polymer solution is included in a hydraulic fracturing fluid.

The liquid polymer or inverse emulsion composition and the inverted polymer solutions according to the embodiments may be used in a subterranean treatment. Such subterranean treatments include, but are not limited to, drilling operations, stimulation treatments, production and completion operations. Those of ordinary skill in the art, with the benefit of this disclosure, will be able to recognize a suitable subterranean treatment.

The liquid polymer or inverse emulsion composition or an inverted polymer solution of the present embodiments may have various uses, for example in crude oil development and production from oil bearing formations that can include primary, secondary or enhanced recovery. Chemical techniques, including for example injecting surfactants (surfactant flooding) to reduce interfacial tension that prevents or inhibits oil droplets from moving through a reservoir or injecting polymers that allow the oil present to more easily mobilize through a formation, can be used before, during or after implementing primary and/or secondary recovery techniques. Such techniques can also be used for enhanced oil recovery, or to complement other enhanced oil recovery techniques.

The liquid polymer or inverse emulsion compositions and inverted polymer solutions can be utilized in such diverse processes as flocculation aids, centrifugation aids, dewatering of mineral slurries, thin lift dewatering, emulsion breaking, sludge dewatering, raw and waste water clarification, drainage and retention aids in the manufacture of pulp and paper, flotation aids in mining processing, color removal, and agricultural applications. Generally, the liquid polymer compositions and inverted polymer solutions described herein can be used as process aids in a variety of solid-liquid separation processes, including but not limited to, flocculation, dewatering, clarification and/or thickening processes or applications. As referred to herein, the term "dewatering" relates to the separation of water from solid material or soil by a solid-liquid separation process, such as by wet classification, centrifugation, filtration or similar processes. In some cases, dewatering processes and apparatus are used to rigidify or improve rigidification of the dispersed particulate materials in the suspension.

The liquid polymer or inverse emulsion compositions and inverted polymer solutions described herein can be used in a variety of dewatering, clarification and/or thickening applications. For example, the liquid polymer or inverse emulsion compositions and inverted polymer solutions can be used in municipal and industrial waste water treatment; clarification and settling of primary and secondary industrial and municipal waste; potable water clarification; in applications in which part or all of the dewatered solids or clarified water is returned to the environment, such as sludge composting, land application of sludge, pelletization for fertilizer application, release or recycling of clarified water, papermaking; food processing applications such as waste dewatering, including waste dewatering of poultry beef, pork and potato, as well as sugar decoloring, sugar processing clarification, and sugar beet clarification; mining and mineral applications, including treatment of various mineral slurries, coal refuse dewatering and thickening, tailings thickening, and Bayer process applications such as red mud settling, red mud washing, Bayer process filtration, hydrate flocculation, and precipitation; biotechnological applications including dewatering and clarification of wastes, such as dewatering and clarification of fermentation broths; and the like.

In embodiments, the liquid polymer or inverse emulsion composition or inverted polymer solution may be used to dewater suspended solids. In embodiments, a method of dewatering a suspension of dispersed solids comprises: (a) intermixing an effective amount of the liquid polymer or inverse emulsion composition or inverted polymer solution, with a suspension of dispersed solids, and (b) dewatering the suspension of dispersed solids.

In embodiments, a method of dewatering an aqueous suspension of dispersed solids comprises: (a) adding an effective amount of a liquid polymer or inverse emulsion composition or inverted polymer solution to the suspension; (b) mixing the liquid polymer or inverse emulsion composition or inverted polymer solution into the suspension to form a treated suspension; and (c) subjecting the treated suspension to dewatering.

The liquid polymer or inverse emulsion compositions or inverted polymer solutions may be employed in the above applications alone, in conjunction with, or serially with, other known treatments.

In embodiments, the liquid polymer or inverse emulsion compositions or inverted polymer solutions may be used in method of deinking of paper mill process water.

In other embodiments, a method of clarifying industrial waste water comprises: adding to the waste water an effective amount of a liquid polymer or inverse emulsion composition; and clarifying the industrial waste water.

In methods the liquid polymer or inverse emulsion compositions or inverted polymer solutions may be used as the sole treatment agent or process aid. In other embodiments, the liquid polymer or inverse emulsion compositions or inverted polymer solutions can be used in combination with other treatment agents and process aids. In embodiments, the method further comprises adding an organic or inorganic coagulant to the waste water.

In embodiments, the liquid polymer or inverse emulsion compositions or inverted polymer solutions may be used in method of sludge dewatering.

In embodiments, the liquid polymer or inverse emulsion compositions or inverted polymer solutions may be used in method of clarification of oily waste water.

The liquid polymer or inverse emulsion compositions or inverted polymer solutions can be used to treat, clarify or demulsify such waste water.

The liquid polymer or inverse emulsion compositions or inverted polymer solutions also may be used in a method of clarifying food processing waste.

In another embodiment, the liquid polymer or inverse emulsion composition or inverted polymer solution may be used in a process for making paper or paperboard from a cellulosic stock.

Other applications which may benefit from the liquid polymer or inverse emulsion compositions or inverted polymer solutions include soil amendment, reforestation, erosion control, seed protection/growth, etc., in which the liquid polymer composition or inverse emulsion or inverted polymer solution is applied to soil.

By way of non-limiting illustration, examples of certain embodiments of the present disclosure are given below.

EXAMPLES

Example 1: Preparation of an Inverse Emulsion Composition

To a 1000 mL beaker (containing a magnetic stir bar), acrylamide (as a 53 wt % solution in water, 276.89 g of solution) was added. The solution was stirred and to this was added glacial acrylic acid (63.76 g), Diethylenetriaminepentaacetic acid (Versenex 80, 40%, 0.53 g) and water (183.31 g). Sodium hydroxide (50 wt %, 70.79 g) was added slowly maintaining the solution temperature below 30° C. until a pH of 6.0-6.5 was achieved. The pH was rechecked and adjusted to 6.0-6.5, if required.

To a 1000 mL beaker (containing a magnetic stir bar) a high boiling paraffin solvent package (211.1 g) was added. The emulsifying surfactant (12.18 g) was added and the mixture was allowed to stir until the surfactants were dissolved. The monomer solution was added to the oil phase (over a period of 30 seconds) with vigorous mixing to form the crude monomer emulsion. Once added, the mixture was allowed to stir for 20 minutes.

The crude monomer emulsion was then homogenized for 20 seconds (using a Ross ME100L homogenizer operating at 4500 rpm). The homogenized emulsion was then transferred to a 1000 mL jacketed reactor equipped with an overhead stirrer, nitrogen and sulfur dioxide gas inlets, thermocouple, vent, and controlled temperature recirculating bath. The reactor contents were then sparged 1.0 hour.

The polymerization reaction was initiated, and the reaction temperature was maintained between about 40 and about 45° C. After the exotherm had ceased, the reaction mixture was warmed to 50° C. and held for 1.5 hours. At the end of 1.5 hours, a sodium metabisulfite solution (37.5 wt %, 17.88 g) was added and allowed to mix for 10 minutes.

Example 2. Preparation of a Liquid Polymer Composition

Emulsion Preparation:

To a 1000 mL beaker (containing a magnetic stir bar), acrylamide (as a 53 wt % solution in water, 276.89 g of solution was added. The solution was stirred and to this was added glacial acrylic acid (63.76 g), Diethylenetriaminepentaacetic acid (Versenex 80, 40%, 0.53 g) and water (183.31 g). Sodium hydroxide (50 wt %, 70.79 g) was added slowly maintaining the solution temperature below 30° C. until a pH of 6.0-6.5 was achieved. The pH was rechecked and adjusted to 6.0-6.5, if required.

To a 1000 mL beaker (containing a magnetic stir bar), a high boiling paraffin solvent package (211.1 g) was added. The emulsifying surfactant (12.18 g) was added and the mixture was allowed to stir until the surfactants were dissolved. The monomer solution was added to the oil phase (over a period of 30 seconds) with vigorous mixing to form the crude monomer emulsion. Once added, the mixture was allowed to stir for 20 minutes.

The crude monomer emulsion was then homogenized for 20 seconds (using a Ross ME100L homogenizer operating at 4500 rpm). The homogenized emulsion was then transferred to a 1000 mL jacketed reactor equipped with an overhead stirrer, nitrogen and sulfur dioxide gas inlets, thermocouple, vent and controlled temperature recirculating bath. The reactor contents were then sparged 1.0 hour.

The polymerization reaction was initiated, and the reaction temperature maintained between about 40° C. and about 45° C. After the exotherm had ceased, the reaction mixture was warmed to 50° C. and held for 1.5 hours. At the end of 1.5 hours, a sodium metabisulfite solution (37.5 wt %, 17.88 g) was added and allowed to mix for 10 minutes.

Water Removal:

Starting emulsions were heated under vacuum in a rotary evaporator to 50° C. until no further distillate condensed. Inverting surfactants were stirred into the resulting dewatered emulsions followed by dissolving these into stirred brine solutions.

Example 3. Preparation and Bench Storage Tests of Example Liquid Polymer Compositions Comprising a Siloxane Polyether Compound Stabilizing Agent 1%, 2% or 3% by weight of one of three different siloxane polyether compound stabilizing agents was slowly added to the composition according to Example 2. Stirring was maintained for at least 20 minutes before commencing the bench storage tests.

Bench storage tests were carried out by placing a standard amount (for example, 40-45 g) of the example liquid polymer compositions comprising a siloxane polyether compound stabilizing agent or a control liquid polymer composition in sample vials. The samples were kept at about 35° C. or about 42-49° C. in an oven and checked for surface bleeding and caking. The silicone polyether compounds included in the compositions tested were: a polyalkylene oxide-modified polydimethylsiloxane in the α,ω-position (A); side chain type polyether (EO/PO ~25/75) silicone (B); side chain type polyether (EO/PO ~40/60) silicone (C); and side chain type polyether (EO/PO ~40/60) silicone (D). The weekly results of the bench storage tests for some of these compounds are provided in Table 1 below.

TABLE 1

| Bench Storage Test Results for samples at 42-49° C. | | | | | | | |
|---|---|---|---|---|---|---|---|
| Sample | 1 week | 2 weeks | 3 weeks | 4 weeks | 5 weeks | 6 weeks | 7 weeks |
| Control | 1 mm of partial hard caking | Thin hard caking | Hard caking, full layer | Thick hard caking, full layer | Thick hard caking, full layer | Thick hard caking, almost all sample | Thick hard caking, almost all sample |
| 1% A | No caking | 1 mm of partial hard caking | Hard caking, less than a full layer | Thick hard caking, full layer | Thick hard caking, full layer | Thick hard caking, half of sample | Thick hard caking, almost all sample |
| 2% A | No caking | No caking | Soft caking, thin, medium | Hard caking, full layer | Hard caking, full layer | Hard caking, full layer | Deep hard caking |

TABLE 1-continued

Bench Storage Test Results for samples at 42-49° C.

| Sample | 1 week | 2 weeks | 3 weeks | 4 weeks | 5 weeks | 6 weeks | 7 weeks |
|---|---|---|---|---|---|---|---|
| 3% A | No caking | No caking | No caking | No caking | No caking | A little resistance; a partial soft cake; thin | Thin soft caking with partial hard cake |
| 1% B | No caking | No caking | 1 mm partial soft caking | 85% thin layer of hard caking | 90% Hard caking, | Hard caking | Deep hard caking |
| 2% B | No caking | No caking | No caking | No caking | No caking | No caking | No caking |
| 3% B | No caking | No caking | No caking | No caking | No caking | No caking | No caking |
| 1% C | No caking | No caking | 1 mm partial soft caking | Medium soft caking, about 25% | Hard caking | Hard caking | Hard caking |
| 2% C | No caking | No caking | No caking | No caking | No caking | No caking | No caking |
| 3% C | No caking | No caking | No caking | No caking | No caking | No caking | No caking |

Liquid polymer composition samples including 3% B or 3% C were stored at 35° C. and observed. After 100 days, neither sample showed any caking. A liquid polymer composition sample including 3% D was stored at 42-49° C. and observed. After 50 days, the sample had not shown any caking.

Example 4. Preparation of Inverted Polymer Solutions from Example Compositions

A synthetic brine was prepared that included the following: $Na^+$, $Ca^{2+}$, $Mg^{2+}$, $Cl^-$, and tds of about 15,000 ppm. The brine formulation was prepared and filtered through 0.45 μm filter before use. Utilizing a 1000 mL beaker, Teflon coated mixing blade and an overhead stirrer, 360 g of brine was added to the beaker. The brine was agitated at 500 rpm and the liquid polymer composition prepared in Example 2 was added to the brine solution through a syringe at a dosage to result in 10,000 ppm, based on active polymer concentration. This was allowed to mix for 2 hours at a constant 500 rpm. This mother solution was diluted to 2,000 ppm utilizing 80 g of the mother solution and 320 g of additional brine. Brine was added to the beaker first which has a mixing blade stirring with an overhead mixer at 500 rpm and the mother solution was added to the shoulder of the vortex in the mixing brine. This was mixed for an additional 2 hours.

Example 5: Testing of Inverted Polymer Solutions from Example Composition for Impact on Filter Ratio Samples of liquid polymer compositions were prepared as described herein. Each liquid polymer composition included a standard inverting surfactant (6% by weight). The stabilizing agents used in these examples are those described in Example 3.

Standard viscosity (SV) was measured by preparing from the liquid polymer composition (or base emulsion) a 0.20 wt % active polymer solution in deionized water. The polymer composition was added to the water while stirring at 500 rpm. Mixing was continued for 45 min. The 0.20 wt % active polymer solution was diluted to a 0.10 wt % active polymer solution with a 11.7 wt % NaCl solution and mixed for 15 min. The pH was adjusted to 8.0-8.5, and then filtered through 200 μm nylon mesh screen. The viscosity was measured at 25° C. on a Brookfield DV-III viscometer.

The liquid polymer compositions were inverted in brine as described in Example 4. Viscosities of the brine solutions were measured utilizing an Anton Paar MC302 performing a shear rate sweep from 0.1 $sec^{-1}$ to 100 $sec^{-1}$ at a controlled temperature of 40° C. utilizing a concentric circle spindle attachment. Data were recorded at 10 $sec^{-1}$ with a target viscosity of 20 cP+/−1 cP.

Filter Ratio:

Filter ratio was measured two ways. The FR5 (filter ratio using a 5 micron filter) was determined by passing 500 mL samples of inverted polymer solution prepared as described above through 5 μm, 47 mm diameter polycarbonate filter under 1 bar pressure of $N_2$ or argon. The FR5 was calculated as $$\frac{\text{time at } 500\,g - \text{time at } 400\,g}{\text{time at } 200\,g - \text{time at } 100\,g}.$$

For this example, a passing result was considered FR5≤1.2. In samples having an FR5>1.2 the product was considered not passing and further testing was not completed.

The FR1.2 (filter ratio using a 1.2 micron filter) was determined by passing 200 mL samples of inverted polymer solution prepared as described above through 1.2 μm, 47 mm diameter polycarbonate filter under 1 bar pressure of $N_2$ or Argon. The FR1.2 was calculated as $$\frac{\text{time at } 200\,g - \text{time at } 180\,g}{\text{time at } 80\,g - \text{time at } 60\,g}$$

and reported. For this example, a passing result was considered FR1.2≤1.5, but the target for the examples was FR1.2≤1.2.

The results of FR1.2 are shown in Table 2.

TABLE 2

Result of FR1.2 for siloxane polyether stabilizing agents.

| Liquid Polymer sample | Stabilizing Agent | Viscosity at 10 sec$^{-1}$, 40° C. (cP) | Filter Ratio at 1.2 µm | Time at 200 g (min) |
|---|---|---|---|---|
| 1 | none (control) | 16.6 | 1.089 | 10.02 |
| 1 | A (3% by weight) | 19.4 | 1.100 | 11.06 |
| 2 | none (control) | 24.4 | 1.241 | 16.49 |
| 2 | B (3% by weight) | 25.8 | 1.159 | 15.92 |
| 2 | C (3% by weight) | 25.4 | 1.205 | 15.95 |
| 2 | D (3% by weight) | 24.3 | 1.152 | 13.90 |

It was noted that the example stabilizing agents have minimal or substantially no adverse effect on the filter ratio. In particular, compositions which included the example stabilizing agents retained the property of, when the composition is inverted in an aqueous solution, providing an inverted polymer solution having a filter ratio using a 1.2 micron filter (FR1.2) of about 1.3, or about 1.2, or less. The addition of the siloxane polyether stabilizing agents did not create statistical changes in the viscosity and filter ratio properties of the example compositions.

Example 6. Preparation and Bench Storage Tests of Example Liquid Polymer Compositions Comprising a Poly(Alkyl)Acrylate Stabilizing Agent Approximately 160 g of a liquid polymer composition prepared according to Example 2 is combined with 6% by weight of a breaker in a 200 mL beaker and stirred with a Teflon overhead stirrer at 500 rpm. 1% by weight of a stabilizing agent was slowly added to the composition. Stirring was maintained for at least 20 minutes before commencing the bench storage tests. The stabilizing agent included in the compositions tested was a ~41% microemulsion of poly(2-ethylhexyl)acrylate.

Bench storage tests were carried out by placing a standard amount (for example, 40-45 g) of the example liquid polymer compositions comprising a poly(alkyl)acrylate stabilizing agent or a control liquid polymer composition in sample vials. The samples were kept at about 35° C. and checked for surface bleeding and caking. The samples containing 1% by weight poly(alkyl)acrylate stabilizing agent did not exhibit hard caking through 30 days.

Example 7. Preparation of Inverted Polymer Solutions from Example Compositions

A synthetic brine was prepared that included the following: Na$^+$, Ca$^{2+}$, Mg$^{2+}$, Cl$^-$, and tds of about 15,000 ppm. The brine formulation was prepared and filtered through 0.45 µm filter before use.

Utilizing a 1000 mL beaker, Teflon coated mixing blade and an overhead stirrer, 360 g of brine was added to the beaker. The brine was agitated at 500 rpm and the liquid polymer composition prepared in Example 2 was added to the brine solution through a syringe at a dosage to result in 10,000 ppm, based on active polymer concentration. This was allowed to mix for 2 hours at a constant 500 rpm. This mother solution was diluted to 2,000 ppm utilizing 80 g of the mother solution and 320 g of additional brine. Brine was added to the beaker first which has a mixing blade stirring with an overhead mixer at 500 rpm and the mother solution was added to the shoulder of the vortex in the mixing brine. This was mixed for an additional 2 hours.

Example 8: Testing of Inverted Polymer Solutions from Example Composition for Impact on Filter Ratio Samples of liquid polymer compositions were prepared as described herein. Each liquid polymer composition included a standard inverting surfactant (6% by weight). The stabilizing agent included in the compositions tested was a ~41% microemulsion of poly(2-ethylhexyl)acrylate.

Standard viscosity (SV) was measured by preparing from the liquid polymer composition (or base emulsion) a 0.20 wt % active polymer solution in deionized water. The polymer composition was added to the water while stirring at 500 rpm. Mixing was continued for 45 min. The 0.20 wt % active polymer solution was diluted to a 0.10 wt % active polymer solution with a 11.7 wt % NaCl solution and mixed for 15 min. The pH was adjusted to 8.0-8.5, and then filtered through 200 µm nylon mesh screen. The viscosity was measured at 25° C. on a Brookfield DV-III viscometer.

The liquid polymer compositions were inverted in brine as described in Example 4.

Viscosities of the brine solutions were measured utilizing an Anton Paar MC302 performing a shear rate sweep from 0.1 sec$^{-1}$ to 100 sec$^{-1}$ at a controlled temperature of 40° C. utilizing a concentric circle spindle attachment. Data were recorded at 10 sec$^{-1}$ with a target viscosity of 20 cP+/−1 cP.

Filter Ratio:

Filter ratio was measured two ways. The FR5 (filter ratio using a 5 micron filter) was determined by passing 500 mL samples of inverted polymer solution prepared as described above through 5 µm, 47 mm diameter polycarbonate filter under 1 bar pressure of N$_2$ or argon. The FR5 was calculated as $$\frac{\text{time at } 500\,g - \text{time at } 400\,g}{\text{time at } 200\,g - \text{time at } 100\,g}.$$

For this example, a passing result was considered FR5≤1.2. In samples having an FR5>1.2 the product was considered not passing and further testing was not completed.

The FR1.2 (filter ratio using a 1.2 micron filter) was determined by passing 200 mL samples of inverted polymer solution prepared as described above through 1.2 µm, 47 mm diameter polycarbonate filter under 1 bar pressure of N$_2$ or Argon. The FR1.2 was calculated as $$\frac{\text{time at } 200\,g - \text{time at } 180\,g}{\text{time at } 80\,g - \text{time at } 60\,g}$$

and reported. For this example, a passing result was considered FR1.2≤1.5, but the target for the examples was FR1.2≤1.2.

The results of FR1.2 are shown in Table 3.

TABLE 3

Results of FR1.2 for poly(alkyl)acrylate stabilizing agents.

| Liquid Polymer sample | Stabilizing Agent | Viscosity at 10 sec$^{-1}$, 40° C. (cP) | Filter Ratio at 1.2 µm | Time at 200 g (min) |
|---|---|---|---|---|
| 1 | none (control) | 18.6 | 1.055 | 10.94 |
| 1 | 1% by weight | 19.3 | 1.139 | 12.54 |
| 2 | none (control) | 21.0 | 1.089 | 14.51 |
| 2 | 2% by weight | 21.8 | 1.350 | 19.58 |

It was noted that the example stabilizing agents have minimal or substantially no adverse effect on the filter ratio. In particular, compositions which included the example stabilizing agents retained the property of, when the composition is inverted in an aqueous solution, providing an inverted polymer solution having a filter ratio using a 1.2 micron filter (FR1.2) of about 1.3, or about 1.2, or less. The poly(alkyl)acrylate stabilizing agent performs well with respect to viscosity and filter ratio when less than 2 weight % dosage is added to the example compositions The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the components and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if a composition is described herein as including a component of type A, a component of type B, a component of type C, or any combination thereof, it is understood that this phrase describes all of the various individual and collective combinations and permutations of these components. For example, in some embodiments, the composition described by this phrase could include only a component of type A. In some embodiments, the composition described by this phrase could include only a component of type B. In some embodiments, the composition described by this phrase could include only a component of type C. In some embodiments, the composition described by this phrase could include a component of type A and a component of type B. In some embodiments, the composition described by this phrase could include a component of type A and a component of type C. In some embodiments, the composition described by this phrase could include a component of type B and a component of type C. In some embodiments, the composition described by this phrase could include a component of type A, a component of type B, and a component of type C. In some embodiments, the composition described by this phrase could include two or more components of type A (e.g., A1 and A2). In some embodiments, the composition described by this phrase could include two or more components of type B (e.g., B1 and B2). In some embodiments, the composition described by this phrase could include two or more components of type C (e.g., C1 and C2). In some embodiments, the composition described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the composition described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the composition described by this phrase could include two or more of a first component (e.g., two or more components of type C (C1 and C2)), optionally one or more of a third component (e.g., optionally one or more components of type A), and optionally one or more of a second component (e.g., optionally one or more components of type B).

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method for hydrocarbon recovery, the method comprising:
   (a) preparing an inverted polymer solution from a liquid polymer or inverse emulsion composition,
      wherein the liquid polymer or inverse emulsion composition comprises:
      (i) one or more hydrophobic liquids;
      (ii) one or more synthetic (co)polymers;
      (iii) one or more emulsifier surfactants;
      (iv) one or more inverting surfactants; and
      (v) one or more stabilizing agents comprising a siloxane polyether compound,
      wherein the siloxane polyether compound is a siloxane polyether compound defined by Formula I:

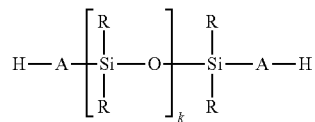

Formula I wherein
   each R is independently selected from methyl, ethyl and propyl; each A independently represents a chain of ethylene oxide (EO) and, optionally, propylene oxide (PO) units, which may be present in block, alternating or random arrangement, wherein the quantity of EO units is in the range of 4 to 30 and the quantity of PO units is in the range of 0 to 30; and k is an integer from 5 to 30; and wherein, when the liquid polymer or inverse emulsion composition is inverted in an aqueous solution, it provides an inverted polymer solution having a filter ratio using a 1.2 micron filter (FR1.2) of about 1.5 or less; and (b) injecting the inverted polymer solution through a wellbore into a subsurface reservoir.

2. The method of claim 1, wherein the liquid polymer or inverse emulsion composition is a liquid polymer composition comprising at least about 39% by weight of one or more synthetic (co)polymers.

3. The method of claim 1, wherein the liquid polymer or inverse emulsion composition is an inverse emulsion composition comprising less than about 35% by weight of one or more synthetic (co)polymers.

4. The method of claim 1, wherein the liquid polymer or inverse emulsion composition comprises about 0.5% to about 8% by weight of the one or more stabilizing agents.

5. The method of claim 1, wherein the liquid polymer or inverse emulsion composition further comprises water in an amount of less than about 10%, by weight based on the total amount of all components of the composition.

6. The method of claim 1, wherein the aqueous solution comprises produced reservoir brine, reservoir brine, sea water, fresh water, produced water, water, saltwater, brine, synthetic brine, synthetic seawater brine, or any combination thereof.

7. The method of claim 1, wherein when the liquid polymer or inverse emulsion composition is inverted in an aqueous solution to provide an inverted polymer solution comprising about 2000 ppm active polymer, the inverted polymer solution has a viscosity of at least 10 cP at 40° C.

8. The method of claim 1, wherein when the liquid polymer or inverse emulsion composition is inverted in the aqueous solution, the inverted polymer solution has a FR1.2 of about 1.1 to about 1.3.

9. The method of claim 1, wherein when the liquid polymer or inverse emulsion composition is inverted in the aqueous solution, the inverted polymer solution has a FR1.2 of about 1.2 or less.

10. The method of claim 1, wherein the one or more hydrophobic liquids having a boiling point at least about 100° C. is selected from the group consisting of paraffin hydrocarbons, naphthene hydrocarbons, aromatic hydrocarbons, olefins, oils, stabilizing surfactants, and mixtures or combinations of the foregoing.

11. The method of claim 1, wherein each of the one or more synthetic (co)polymers comprises at least 30% by weight of acrylamide monomer units with respect to the total amount of all monomeric units in the synthetic (co)polymer, and wherein each of the one or more synthetic (co)polymers comprises at least one additional ethylenically unsaturated monomer.

12. The method of claim 1, wherein at least one of the one or more synthetic (co)polymers comprises 2-acrylamido-2-methylpropanesulfonic acid or salts thereof.

13. The method of claim 1, wherein preparing step (a) provides the inverted polymer solution in less than 30 minutes.

14. The method of claim 1, wherein the wellbore in step (b) is an injection wellbore associated with an injection well, and the method further comprises providing a production well spaced apart from the injection well a predetermined distance and having a production wellbore in fluid communication with the subsurface reservoir, and wherein the injection of the inverted polymer solution in step (b) increases the flow of hydrocarbons to the production wellbore.

15. The method of claim 14, wherein the method further comprises producing production fluid from the production well, the production fluid including at least a portion of the injected inverted polymer solution; and using the production fluid to invert additional liquid polymer or inverse emulsion composition to form a second inverted polymer solution.

16. The method of claim 15, further comprising injecting the second inverted polymer solution into at least one injection well.

17. The method of claim 1, wherein the subsurface reservoir is a subsea reservoir.

18. The method of claim 1, wherein the subsurface reservoir has a permeability of from 10 millidarcy to 40,000 millidarcy.

19. The method of claim 1, wherein the wellbore in step (b) is a wellbore for hydraulic fracturing that is in fluid communication with the subsurface reservoir.

20. The method of claim 19, wherein the inverted polymer solution injected in step (b) functions as a drag reducer that reduces friction during injection in step (b).

21. The method of claim 1, wherein the inverted polymer solution is used as an injection fluid.

22. The method of claim 1, wherein the inverted polymer solution is included in an injection fluid.

23. The method of claim 19, wherein the inverted polymer solution is used as a hydraulic fracturing fluid.

24. The method of claim 19, wherein the inverted polymer solution is included in a hydraulic fracturing fluid.

25. The method of claim 1, where the inverted polymer solution has a concentration of the one or more synthetic (co)polymers of from 50 to 15,000 ppm.

26. The method of claim 1, wherein step (a) comprises a continuous process.

27. The method of claim 1, wherein step (a) comprises a single step.

28. The method of claim 27, wherein the single step comprises diluting the liquid polymer or inverse emulsion composition in the aqueous fluid in an in-line mixer having a mixer inlet and a mixer outlet to provide the inverted polymer solution.

29. The method of claim 1, wherein step (a) comprises multiple steps.

30. The method of claim 29, wherein the inversion of the liquid polymer or inverse emulsion composition comprises as a first step, inverting the liquid polymer or inverse emulsion composition in the aqueous fluid in a first in-line mixer having a first mixer inlet and a first mixer outlet to provide a concentrated polymer composition having a concentration of synthetic (co)polymer of up to 15,000 ppm; and as a second step, diluting the concentrated polymer composition in the aqueous fluid in a second in-line mixer having a second mixer inlet and a second mixer outlet to provide the inverted polymer solution.

31. The method of claim 1, wherein step (a) comprises parallel single steps, parallel multiple steps, or any combination thereof.

32. The method of claim 31, wherein the parallel single steps, parallel multiple steps, or any combination thereof include using at least one in-line mixer for diluting the liquid polymer or inverse emulsion composition in the aqueous fluid, the in-line mixer having a mixer inlet and a mixer outlet to provide the inverted polymer solution.

33. The method of claim 1, wherein the aqueous fluid further comprises a surfactant, an alkalinity agent, a cosolvent, a chelating agent, or any combination thereof.

34. The method of claim 1, wherein the one or more synthetic (co)polymers comprise one or more acrylamide-(co)polymers.

35. The method of claim 1, wherein the one or more hydrophobic liquids have a boiling point at least about 100° C.

* * * * *

UNITED STATES PATENT AND TRADEMARK OFFICE
CERTIFICATE OF CORRECTION

Page 1 of 1

PATENT NO. : 11,220,622 B2
APPLICATION NO. : 16/024147
DATED : January 11, 2022
INVENTOR(S) : Hong Yang and Frances Troy It is certified that error appears in the above-identified patent and that said Letters Patent is hereby corrected as shown below:

On the Title Page

Item (72) reading:
Inventors: Hong Yang, Atlanta, GA (US); Frances Fournier, Marietta, GA (US)
Should read:
Inventors: Hong Yang, Atlanta, GA (US); Frances Troy, Marietta, GA (US)

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*